(12) United States Patent
Matsumura et al.

(10) Patent No.: US 8,129,447 B2
(45) Date of Patent: *Mar. 6, 2012

(54) INK COMPOSITION AND INKJET RECORDING METHOD USING THE SAME

(75) Inventors: Tokihiko Matsumura, Ashigarakami-gun (JP); Tsutomu Umebayashi, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 578 days.

This patent is subject to a terminal disclaimer.

(21) Appl. No.: 12/207,162

(22) Filed: Sep. 9, 2008

(65) Prior Publication Data

US 2009/0087575 A1    Apr. 2, 2009

(30) Foreign Application Priority Data

Sep. 28, 2007 (JP) ................................. 2007-256379
Sep. 28, 2007 (JP) ................................. 2007-256381

(51) Int. Cl.
C09D 11/00 (2006.01)
C09D 11/10 (2006.01)
C08F 2/46 (2006.01)

(52) U.S. Cl. ............ 523/160; 522/16; 522/63; 522/167; 522/168; 522/169; 427/487

(58) Field of Classification Search .................. 523/160, 523/161; 106/31.13; 427/487, 517, 519; 522/167, 168, 16, 26, 63, 169
See application file for complete search history.

(56) References Cited

U.S. PATENT DOCUMENTS

| | | | |
|---|---|---|---|
| 4,134,813 A | 1/1979 | Kuesters et al. | |
| 4,315,807 A | 2/1982 | Felder et al. | |
| 4,585,876 A | 4/1986 | Fischer et al. | |
| 5,145,885 A | 9/1992 | Berner et al. | |
| 5,310,618 A * | 5/1994 | Kawamura | 430/157 |
| 5,534,559 A | 7/1996 | Leppard et al. | |
| 5,707,781 A | 1/1998 | Wilczak | |
| 6,019,992 A | 2/2000 | Carson et al. | |
| 6,287,749 B1 | 9/2001 | Nagarajan et al. | |
| 6,528,232 B1 | 3/2003 | Maeda et al. | |
| 2005/0146544 A1 | 7/2005 | Kondo | |
| 2006/0128823 A1* | 6/2006 | Tsuchimura et al. | 522/71 |
| 2007/0120881 A1 | 5/2007 | Tsubaki | |
| 2007/0211111 A1 | 9/2007 | Hayata | |
| 2008/0182031 A1* | 7/2008 | Matsumura et al. | 427/519 |
| 2008/0239045 A1* | 10/2008 | Umebayashi et al. | 347/102 |
| 2009/0087575 A1 | 4/2009 | Matsumura et al. | |
| 2009/0186163 A1* | 7/2009 | Umebayashi et al. | 427/511 |
| 2010/0015352 A1 | 1/2010 | Matsumura et al. | |

FOREIGN PATENT DOCUMENTS

| | | |
|---|---|---|
| DE | 41 17 962 A1 | 12/1991 |
| DE | 195 01 025 A1 | 7/1996 |
| DE | 100 54 550 A1 | 5/2001 |
| EP | 1 739 141 A1 | 1/2007 |
| EP | 1 757 457 A1 | 2/2007 |
| EP | 1 816 173 B1 | 8/2007 |
| EP | 1 826 252 B1 | 8/2007 |
| EP | 1 829 680 A | 9/2007 |
| EP | 1 944 173 A | 7/2008 |
| EP | 1 975 210 A | 10/2008 |
| EP | 2042573 A1 | 4/2009 |
| EP | 2 033 949 A | 11/2009 |
| JP | 56-143202 A | 11/1981 |
| JP | 63-060783 A | 3/1988 |
| JP | 63-235382 A | 9/1988 |

(Continued)

OTHER PUBLICATIONS

Ciba Specialty Chemicals "Photoinitiators for Printing Applications: Key Products Selection Guide", Ciba Specialty Chemicals pp. 1-8 (2005). Ciba IRGACURE 819 Photoinitiator, Ciba Specialty Chemicals Inc, Aug. 30, 2001 pp. 1-3.
Ciba DAROCUR TPO Photoinitiator, Ciba Specialty Chemicals Inc, Aug. 29, 2001 pp. 1-3.
Ciba IRGACURE 907, Ciba Specialty Chemicals Inc, Sep. 4, 2001 pp. 1-3.
Extended European Search Report on European Application No. 08 01 5831, dated May 17, 2010.
Beilstein Institute for Organic Chemistry, XP002580198, Frankfurt-Main, DE; Dec. 31, 1975.

(Continued)

*Primary Examiner* — Vasu Jagannathan
*Assistant Examiner* — Hannah Pak
(74) *Attorney, Agent, or Firm* — Sughrue Mion, PLLC

(57) ABSTRACT

The invention provides an ink composition including (i) a sensitizing dye having a polymerizable group as a substituent, (ii) a polymerization initiator and (iii) a polymerizable compound having an ethylenically unsaturated bond. The invention also provides an inkjet recording method and a polymerizable compound useful as a sensitizing dye. The sensitizing dye (i) is represented by Formula (I) or (II) below. In the formulae, X represents O, S, $NR^a$, or $NR^b$, n1 and n2 each represent 0 or 1, $R^a$, $R^b$, and $R^1$ to $R^{18}$ each represent a hydrogen atom or a monovalent substituent, and one polymerizable group is present in the molecule.

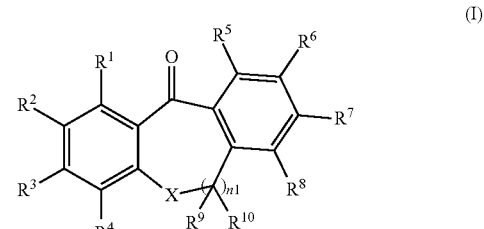

(I)

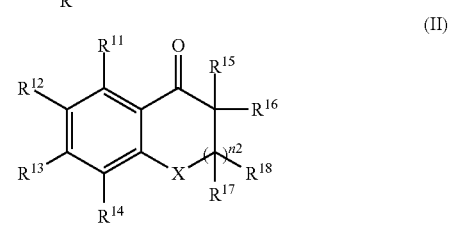

(II)

17 Claims, No Drawings

FOREIGN PATENT DOCUMENTS

| | | |
|---|---|---|
| JP | 1-253731 A | 10/1989 |
| JP | 3-216379 A | 9/1991 |
| JP | 5-214280 A | 8/1993 |
| JP | 6-21256 B2 | 3/1994 |
| JP | 6-62905 B2 | 8/1994 |
| JP | 6-308727 A | 11/1994 |
| JP | 08-174997 A | 7/1996 |
| JP | 2003-145745 A | 5/2003 |
| JP | 2004-042525 A | 2/2004 |
| JP | 2004-042548 A | 2/2004 |
| JP | 2005-096254 A | 4/2005 |
| JP | 2005-512973 A | 5/2005 |
| JP | 2006-137183 A | 6/2006 |
| JP | 2006-137185 A | 6/2006 |
| JP | 2006-182970 A | 7/2006 |

OTHER PUBLICATIONS

Bruce M. Monroe et al., "Photoinitiators for Free-Radical-Initiated Photoimaging Systems", Chemicals Reviews, 1993, pp. 435-448, vol. 93.

Ciba Irgacure 819 Product Information pp. 1-4, Aug. 8, 1997.

Ciba Darocur TPO Product Information pp. 1-3, Aug. 29, 2001.

Third Party Observation under Art. 115 EPC. dated Dec. 21, 2010.

Office Action dated Apr. 7, 2011 on European Application No. 08 015 831.4.

* cited by examiner

INK COMPOSITION AND INKJET RECORDING METHOD USING THE SAME

CROSS-REFERENCE TO RELATED APPLICATION

This application claims priority under 35USC 119 from Japanese Patent Application Nos. 2007-256379 and 2007-256381, the disclosure of which is incorporated by reference herein.

BACKGROUND OF THE INVENTION

1. Field of the Invention

The present invention relates to an ink composition, an inkjet recording method using the same and a novel compound having a heterocyclic structure and a polymerizable group in the molecule. More specifically, the invention relates to an ink composition that is curable with high sensitivity upon exposure to active radiation and suitable for use in inkjet recording and can be cured into a product having sufficient flexibility even after curing, and also relates to an inkjet recording method and a novel polymerizable compound useful as a sensitizing dye.

2. Description of the Related Art

Examples of an image recording method for forming an image on a medium to be recorded such as paper on the basis of an image data signal include an electrophotographic mode, a sublimation type and fusion type thermal transfer mode and an inkjet mode. Since the electrophotographic mode needs a process for forming an electrostatic latent image on a photoreceptor drum by means of electrostatic charge and exposure, the system becomes complicated, resulting in high manufacturing costs. Also, in the thermal transfer mode, though an apparatus is inexpensive, an ink ribbon is used, and therefore, not only are the running costs high, but waste is generated.

On the other hand, in the inkjet mode, not only is an apparatus inexpensive, but an ink is discharged into only a required image part, thereby forming an image directly on a medium to be recorded. Therefore, the ink can be efficiently used, and the running costs are inexpensive. Furthermore, a noise is low, and this inkjet mode is excellent as an image recording mode.

As an ink composition which is curable upon irradiation with active radiation rays such as ultraviolet rays (radiation curable ink composition), for example, ink compositions which can be cured with high sensitivity to form an image with high image quality are demanded as an inkjet recording ink composition. By achieving high sensitization, advantages are achieved in that consumed electric power can be reduced and in that a load to an active radiation ray generator is decreased, whereby a high life span can be realized. Furthermore, by achieving high sensitization, since sufficient curing is achieved upon irradiation with active radiation rays, various advantages are achieved such as in that the vaporization of uncured low-molecular weight substances is suppressed and in that a lowering of the strength of a formed image is suppressed.

Compounds having polymerizing ability are useful for a variety of curable compositions. Compositions curable upon exposure to active radiation such as ultraviolet light are required to be curable with high sensitivity upon exposure to the radiation and to be capable of forming a high-quality cured film. Among such compositions, for example, colored curable compositions capable of forming a colored cured film are used as ink compositions and the like.

In recent years, a curable inkjet mode by ultraviolet light is receiving attention, because its odor level is relatively low and because it has quick-drying properties and allows recording on a non-ink-absorbing medium to be recorded.

Such a photopolymerizable or photo-curable ink composition uses a photopolymerization initiator, examples of which generally include benzil, benzoin, benzoin ethyl ether, Michler's ketone, anthraquinone, acridine, phenazine, benzophenone, and 2-ethylanthraquinone (see for example Japanese Patent Application Laid-Open (JP-A) No. 06-308727. Photopolymerizable compositions using these common photopolymerization initiators do not always have sufficient curing sensitivity and sometimes need a long time for exposure to light in image forming. When fine images are formed, such compositions have a problem in which if slight vibrations occur in the process of forming images, high-quality images cannot be formed. In addition, since the total amount of the energy radiation from the light source for the exposure can increase, a large amount of the associated heat radiation has to be taken into account.

It has been proposed that methods for increasing the sensitivity of radiation-curable polymerizable compounds to radiation should use a photopolymerization initiator in combination with a sensitizing dye, and the use of various polymerization initiating systems are disclosed. For example, it has been proposed that thioxanthone compounds should be used as sensitizing dyes (see for example JP-A Nos. 06-308727 and 56-143202). Even after the curing of the polymerizable compositions, however, such sensitizing dyes as thioxanthone compounds remain as monomers, which are not bonded to the other compounds in the cured film and therefore tend to cause a problem in which they can migrate to other materials in contact with the cured film, behave as low-molecular-weight components to reduce the strength of the cured film similarly to plasticizers, or cause the surface of the cured film to have stickiness so that the surface curing sensitivity can be reduced.

In the technical field using ink compositions, it is an important issue to prevent blocking between an image formed in an ink receiving layer and other materials in contact with the image, specifically, to prevent the transfer of ink from the image to the other materials or to prevent ink-induced undesirable adhesion to other materials. Therefore, it is proposed that polyfunctional thioxanthone compounds with good antiblocking properties should be used for ink compositions (see for example Japanese National Phase Publication (Laid-Open) No. 2005-512973). However, the resulting ink compositions have high viscosity and therefore are not suitable for inkjet recording.

SUMMARY OF THE INVENTION

The present invention has been made in view of the above circumstances and provides an ink composition and ink jet recording method therewith.

A first aspect of the present invention provides an ink composition, comprising: (i) a sensitizing dye that has a polymerizable substituent and is represented by the following Formula (I) or Formula (II), (ii) a polymerization initiator, and (iii) a polymerizable compound having an ethylenically unsaturated bond:

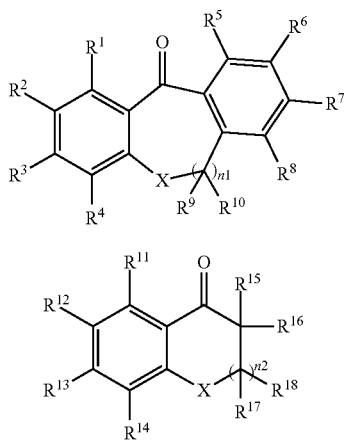

(I)

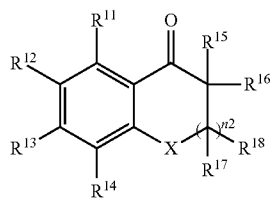

(II)

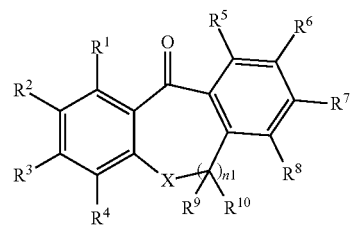

(I)

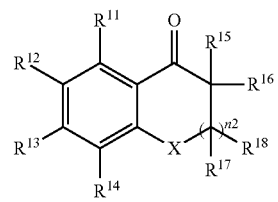

(II)

wherein in Formula (I), X represents O, S or $NR^a$; n1 represents 0 or 1; and $R^a$, $R^1$, $R^2$, $R^3$, $R^4$, $R^5$, $R^6$, $R^7$, $R^8$, $R^9$, and $R^{10}$ each independently represent a hydrogen atom or a monovalent substituent, provided that at least one of $R^a$, $R^1$, $R^2$, $R^3$, $R^4$, $R^5$, $R^6$, $R^7$, $R^8$, $R^9$, or $R^{10}$ has a polymerizable unsaturated double bond; wherein in Formula (II), X represents O, S or $NR^b$; n2 represents 0 or 1; and $R^b$, $R^{11}$, $R^{12}$, $R^{13}$, $R^{14}$, $R^{15}$, $R^{16}$, $R^{17}$, and $R^{18}$ each independently represent a hydrogen atom or a monovalent substituent, provided that at least one of $R^b$, $R^{11}$, $R^{12}$, $R^{13}$, $R^{14}$, $R^{15}$, $R^{16}$, $R^{17}$, or $R^{18}$ has a polymerizable unsaturated double bond; and wherein any adjacent two of $R^1$, $R^2$, $R^3$, $R^4$, $R^5$, $R^6$, $R^7$, $R^8$, $R^{11}$, $R^{12}$, $R^{13}$, or $R^{14}$ may be joined to form a ring.

DETAILED DESCRIPTION OF THE INVENTION

An object of the present invention is to provide an ink composition that is curable with high sensitivity even upon exposure with low-power radiation and capable of forming high-quality images and has high anti-blocking property which allow the formation of less sticky image surfaces, to provide an inkjet recording method using the ink composition, and to provide a novel polymerizable compound useful as a sensitizing dye.

In order to solve the problems described above, the inventors have made intensive investigations, and as a result, it has been found that an ink composition containing a certain sensitizing dye having a polymerizable group as a substituent is curable with high sensitivity to form a film having a less sticky surface and exhibiting high anti-blocking property. At the same time, it has also been found that a specific compound having a heterocyclic structure in the molecule is useful as such a sensitizing dye having a polymerizable group as a substituent. Based on the finding, the invention has been completed.

The ink composition of the present invention is characterized in that it includes (i) a sensitizing dye having a polymerizable group as a substituent, (ii) a polymerization initiator and (iii) a polymerizable compound having an ethylenically unsaturated bond.

In a preferred embodiment of the invention, (i) the sensitizing dye having a polymerizable group as a substituent is at least one selected from the compound represented by Formula (I) below and the compound represented by Formula (II) below. Hereinafter, such a sensitizing dye is also referred to as "the specific sensitizing dye," as needed.

In Formula (I), X represents O, S or $NR^a$; n1 represents 0 or 1; $R^a$, $R^1$, $R^2$, $R^3$, $R^4$, $R^5$, $R^6$, $R^7$, $R^8$, $R^9$, and $R^{10}$ each independently represent a hydrogen atom or a monovalent substituent, provided that at least one of $R^a$, $R^1$, $R^2$, $R^3$, $R^4$, $R^5$, $R^6$, $R^7$, $R^8$, $R^9$, and $R^{10}$ is a radically-reactive polymerizable group.

In Formula (II), X represents O, S or $NR^b$; n2 represents 0 or 1; and $R^b$, $R^{11}$, $R^{12}$, $R^{13}$, $R^{14}$, $R^{15}$, $R^{16}$, $R^{17}$, and $R^{18}$ each independently represent a hydrogen atom or a monovalent substituent, provided that at least one of $R^b$, $R^{11}$, $R^{12}$, $R^{13}$, $R^{14}$, $R^{15}$, $R^{16}$, $R^{17}$, and and $R^{18}$ is a radically-reactive polymerizable group.

Any adjacent two of $R^1$, $R^2$, $R^3$, $R^4$, $R^5$, $R^6$, $R^7$, $R^8$, $R^{11}$, $R^{12}$, $R^{13}$, and $R^{14}$ may link together to form a ring.

When the ink composition of the invention is used to form a colored image, it is preferred that the ink composition further contains (iv) a coloring agent. The ink composition of the invention is curable with high sensitivity upon exposure to radiation and therefore suitable for use in inkjet recording.

The inkjet recording method of the present invention is characterized in that it includes: (a) ejecting the ink composition of the invention onto a medium to be recorded; and (b) applying active radiation to the ejected ink composition to cure the ink composition.

Although not fully understood, the mechanism described below may be assumed with respect to the invention.

The sensitizing dye for use in the invention is characterized by having a polymerizable group and thus can function by the sensitizing dye itself as a polymerizable compound. Therefore, the content of the polymerizable group in the ink composition is so high that the crosslink density of the cured film can increase. The sensitizing dye is also less likely to remain in the form of a free low-molecular-weight compound in the cured film. Therefore, it can be considered that the phenomenon that the sensitizing dye migrates to other materials in contact therewith or moves to the surface of the cured film to cause stickiness is less likely to occur. It is concluded that the ink composition of the invention containing such a sensitizing dye is curable with high sensitivity even upon exposure with low-power radiation and can reduce the surface stickiness and have a high level of anti-blocking property.

[Ink Composition]

The ink composition of the invention is first described in detail below.

The ink composition of the invention includes (i) a sensitizing dye having a polymerizable group as a substituent, (ii)

a polymerization initiator and (iii) a polymerizable compound having an ethylenically unsaturated bond.

The ink composition of the invention is suitable for use in inkjet recording.

The essential components of the ink composition of the invention are described below one by one.

<(i) Sensitizing Dye Having Polymerizable Group as a Substituent>

The ink composition of the invention contains a sensitizing dye to facilitate the decomposition of the polymerization initiator upon exposure with active rays. Such a sensitizing dye to be used has a radically-reactive polymerizable group.

In general, a sensitizing dye has an electronic excitation state, when it absorbs specific active radiation. When the sensitizing dye in the electronically excited state comes into contact with the polymerization initiator, actions such as electron transfer, energy transfer and generation of heat occur to promote chemical change of the polymerization initiator, specifically decomposition of the initiator or generation of active species such as radicals, acids or bases. The generated active species can cause or promote polymerization or curing reaction of the polymerizable compound as described later.

The compound to be used as the sensitizing dye may be selected depending on the wavelength of the active radiation with which initiating species can be generated for the polymerization initiator used in the ink composition. Preferred examples of the sensitizing dye should have an absorption wavelength in a range of from 350 nm to 450 nm and high triplet energy, because the ink composition is subjected to a general curing reaction.

Since the sensitizing dye used in the invention has a polymerizable group, it is useful to increase the curing sensitivity or to immobilize itself in a cured film.

The polymerizable group in the sensitizing dye includes be a substituent having an ethylenically unsaturated bond. For example, the radically-reactive polymerizable group is preferably acryloyl, methacryloyl, styryl, vinyl, or allyl, and more preferably acryloyl or methacryloyl.

It is enough that the sensitizing dye has at least one polymerizable group in the molecule. The sensitizing dye may also have two or more polymerizable groups in the molecule. The viscosity of the ink may increase with the increase in number of the polymerizable groups. In view of viscosity, therefore, the number of the polymerizable groups is preferably as small as possible. The sensitizing dye preferably has one or two polymerizable groups, and most preferably only one polymerizable group.

Such a sensitizing dye is preferably a sensitizing dye represented by Formula (I) or (II) below.

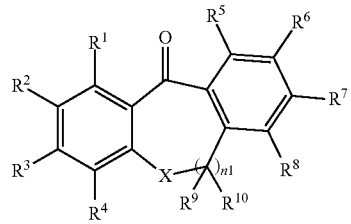

(I)

In Formula (I), X represents O, S or $NR^a$; n1 represents 0 or 1; and $R^a$, $R^1$, $R^2$, $R^3$, $R^4$, $R^5$, $R^6$, $R^7$, $R^8$, $R^9$, and $R^{10}$ each independently represent a hydrogen atom or a monovalent substituent, provided that at least one of $R^a$, $R^1$, $R^2$, $R^3$, $R^4$, $R^5$, $R^6$, $R^7$, $R^8$, $R^9$, and $R^{10}$ is a radically-reactive polymerizable group.

The sensitizing dye, represented by Formula (I) preferably has one polymerizable group. The position of which the polymerizable group substitutes is preferably the position of $R^2$, $R^6$, $R^9$, or $R^{10}$.

The monovalent substituent that is other than the polymerizable group and represented by $R^a$, $R^1$, $R^2$, $R^3$, $R^4$, $R^5$, $R^6$, $R^7$, $R^8$, $R^9$, or $R^{10}$ may be a halogen atom, aliphatic group, an aromatic group, a heterocyclic group, cyano, hydroxy, nitro, amino, alkylamino, alkoxy, aryloxy, amido, arylamino, ureido, sulfamoylamino, alkylthio, arylthio, alkoxycarbonylamino, sulfonamido, carbamoyl, sulfamoyl, substituted sulfonyl, alkoxycarbonyl, heterocyclic oxy, azo, acyloxy, carbamoyloxy, silyloxy, aryloxycarbonyl, aryloxycarbonylamino, imido, heterocyclic thio, substituted sulfinyl, substituted phosphoryl, acyl, carboxy, or sulfo. Alkyl, a halogen atom, alkoxy, alkylthio, or carboxy is preferred, and alkyl or a halogen atom is particularly preferred.

The radically-reactive polymerizable group is preferably acryloyl, methacryloyl, styryl, vinyl, vinyl ester, or allyl. Acryloyl, methacryloyl, or vinyl ester is more preferred, and acryloyl is even more preferred.

When the monovalent substituent represented by $R^a$, $R^1$, $R^2$, $R^3$, $R^4$, $R^5$, $R^6$, $R^7$, $R^8$, $R^9$, or $R^{10}$ is alkyl in Formula (I), the alkyl is preferably alkyl having 1 to 4 carbon atoms, such as methyl, ethyl, propyl, isopropyl, n-butyl, sec-butyl, or tert-butyl, more preferably methyl, ethyl, propyl, or isopropyl, and particularly preferably methyl or ethyl.

In a similar manner, the alkoxy is preferably alkoxy having 1 to 4 carbon atoms, such as methoxy, ethoxy, hydroxyethoxy, isopropoxy, propoxy, n-butoxy, isobutoxy, sec-butoxy, or tert-butoxy, more preferably methoxy, ethoxy, isopropoxy, or propoxy, and particularly preferably methoxy or ethoxy.

The halogen atom is a fluorine atom, a chlorine atom, a bromine atom, or an iodine atom, more preferably a chlorine atom, a bromine atom or an iodine atom, and particularly preferably a chlorine atom or a bromine atom.

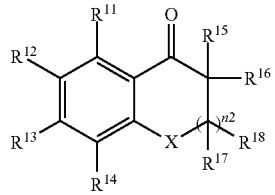

(II)

In Formula (II), X represents O, S or $NR^b$; n2 represents 0 or 1; and $R^b$, $R^{11}$, $R^{12}$, $R^{13}$, $R^{14}$, $R^{15}$, $R^{16}$, $R^{17}$ and $R^{18}$ each independently represent a hydrogen atom or a monovalent substituent, provided that at least one of $R^b$, $R^{11}$, $R^{12}$, $R^{13}$, $R^{14}$, $R^{15}$, $R^{16}$, $R^{17}$, and $R^{18}$ is a radically-reactive polymerizable group.

The sensitizing dye represented by Formula (II) preferably has one polymerizable group. The position of which the polymerizable group substitutes is preferably the position of $R^{12}$, $R^{17}$ or $R^{18}$.

The monovalent substituent that is other than the polymerizable group and represented by $R^b$, $R^{11}$, $R^{12}$, $R^{13}$, $R^{14}$, $R^{15}$, $R^{16}$, $R^{17}$, or $R^{18}$ may be a halogen atom, an aliphatic group, an aromatic group, a heterocyclic group, cyano, hydroxy, nitro, amino, alkylamino, alkoxy, aryloxy, amido, arylamino, ureido, sulfamoylamino, alkylthio, arylthio, alkoxycarbonylamino, sulfonamido, carbamoyl, sulfamoyl, substituted sulfonyl, alkoxycarbonyl, heterocyclic oxy, azo, acyloxy, carbamoyloxy, silyloxy, aryloxycarbonyl, aryloxycarbonylamino, imido, heterocyclic thio, substituted sulfinyl, substituted phosphoryl, acyl, carboxy, or sulfo. Alkyl, a halogen atom, alkoxy, alkylthio, or carboxy is preferred, and alkyl or a halogen atom is particularly preferred.

The radically-reactive polymerizable group is preferably acryloyl, methacryloyl, styryl, vinyl, vinyl ester, or allyl. Acryloyl, methacryloyl, or vinyl ester is more preferred, and acryloyl is even more preferred.

When the monovalent substituent represented by $R^b$, $R^{11}$, $R^{12}$, $R^{13}$, $R^{14}$, $R^{15}$, $R^{16}$, $R^{17}$, or $R^{18}$ is alkyl in Formula (II), the alkyl is preferably alkyl having 1 to 4 carbon atoms, such as methyl, ethyl, propyl, isopropyl, n-butyl, sec-butyl, or tert-butyl, more preferably methyl, ethyl, propyl, or isopropyl, and particularly preferably methyl or ethyl.

In a similar manner, the alkoxy is preferably alkoxy having 1 to 4 carbon atoms, such as methoxy, ethoxy, hydroxyethoxy, isopropoxy, propoxy, n-butoxy, isobutoxy, sec-butoxy, or tert-butoxy, more preferably methoxy, ethoxy, isopropoxy, or propoxy, and particularly preferably methoxy or ethoxy.

The halogen atom is a fluorine atom, a chlorine atom, a bromine atom, or an iodine atom, more preferably a chlorine atom, a bromine atom or an iodine atom, and particularly preferably a chlorine atom or a bromine atom.

Any adjacent two of $R^{11}$, $R^{12}$, $R^{13}$, and $R^{14}$ may link together, for example, may be condensed, to form a ring.

The ring structure formed by the substituents may be a five- or six-membered aliphatic or aromatic ring. The ring structure may also be a heterocycle containing an atom or atoms other than carbon. The rings formed may also combine to form a fused ring such as a dinuclear ring. The ring structure may also have a substituent, examples of which include those of the monovalent substituent represented by any of $R^1$ to $R^8$ in Formula (I). When a heterocyclic structure is formed, the heteroatom is, for example, N, O or S.

Among these, the sensitizing dye is more preferably a cyclic compound containing a sulfur atom which is represented by Formula (I-A) or (II-A) below, because it has high curing sensitivity.

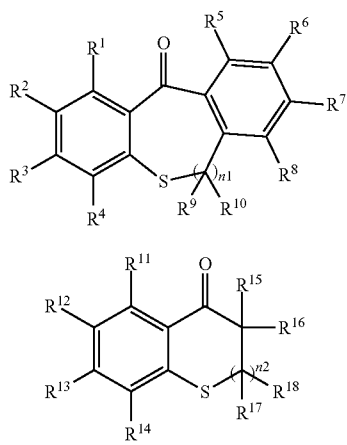

(I-A)

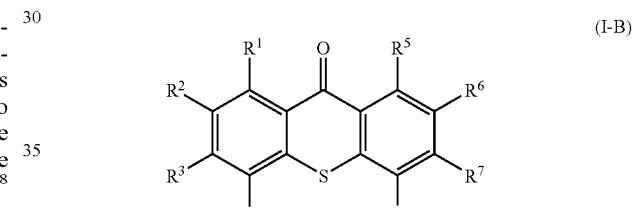

(II-A)

In Formula (I-A), $R^a$, $R^1$, $R^2$, $R^3$, $R^4$, $R^5$, $R^6$, $R^7$, $R^8$, $R^9$, and $R^{10}$ each independently represent a hydrogen atom, a halogen atom, hydroxy, cyano, nitro, amino, alkylthio, alkylamino, alkoxy, alkoxycarbonyl, acyloxy, acyl, carboxy, or sulfo.

The radically-reactive polymerizable group is preferably acryloyl, methacryloyl, styryl, vinyl, vinyl ester, or allyl. Acryloyl, methacryloyl, or vinyl ester is more preferred, and acryloyl is even more preferred.

In Formula (II-A), $R^b$, $R^{11}$, $R^{12}$, $R^{13}$, $R^{14}$, $R^{15}$, $R^{16}$, $R^{17}$, and $R^{18}$ each independently represent a hydrogen atom, a halogen atom, hydroxy, cyano, nitro, amino, alkylthio, alkylamino, alkoxy, alkoxycarbonyl, acyloxy, acyl, carboxy, or sulfo.

The radically-reactive polymerizable group is preferably acryloyl, methacryloyl, styryl, vinyl, vinyl ester, or allyl. Acryloyl, methacryloyl, or vinyl ester is more preferred, and acryloyl is even more preferred.

Any adjacent two of $R^1$, $R^2$, $R^3$, $R^4$, $R^5$, $R^6$, $R^7$, $R^8$, $R^{11}$, $R^{12}$, $R^{13}$, and $R^{14}$ may link together, for example, may be condensed, to form a ring.

Examples of the ring structure formed by the substituents include a five- or six-membered aliphatic or aromatic ring. The ring structure may also be a heterocycle containing an atom or atoms other than carbon. The rings formed may also combine to form a fused ring such as a dinuclear ring. The ring structure may also have a substituent, examples of which include those of the monovalent substituent represented by any of $R^1$ to $R^8$ in Formula (I). When a heterocyclic structure is formed, the heteroatom is, for example, N, O or S.

The sensitizing dye represented by Formula (I-B) or (II-B) below is also preferably used.

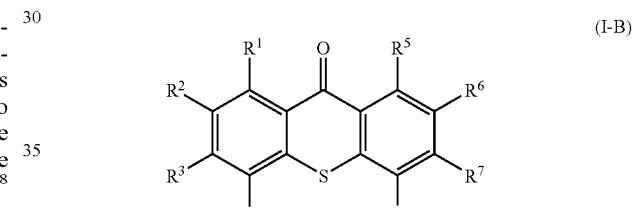

(I-B)

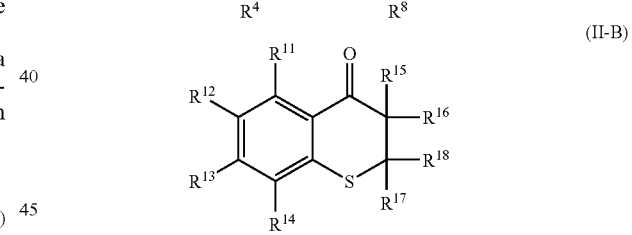

(II-B)

In Formula (I-B), $R^a$, $R^1$, $R^2$, $R^3$, $R^4$, $R^5$, $R^6$, $R^7$, $R^8$, $R^9$, and $R^{10}$ each independently represent a hydrogen atom, a halogen atom, hydroxy, cyano, nitro, amino, alkylthio, alkylamino, alkoxy, alkoxycarbonyl, acyloxy, acyl, carboxy, or sulfo.

The radically-reactive polymerizable group is preferably acryloyl, methacryloyl, styryl, vinyl, vinyl ester, or allyl. Acryloyl, methacryloyl, or vinyl ester is more preferred, and acryloyl is even more preferred.

In Formula (II-B), $R^b$, $R^{11}$, $R^{12}$, $R^{13}$, $R^{14}$, $R^{15}$, $R^{16}$, $R^{17}$, and $R^{18}$ each independently represent a hydrogen atom, a halogen atom, hydroxy, cyano, nitro, amino, alkylthio, alkylamino, alkoxy, alkoxycarbonyl, acyloxy, acyl, carboxy, or sulfo.

The radically-reactive polymerizable group is preferably acryloyl, methacryloyl, styryl, vinyl, vinyl ester, or allyl. Acryloyl, methacryloyl, or vinyl ester is more preferred, and acryloyl is even more preferred.

Any adjacent two of $R^1$, $R^2$, $R^3$, $R^4$, $R^5$, $R^6$, $R^7$, $R^8$, $R^{11}$, $R^{12}$, $R^{13}$, or $R^{14}$ may link together, for example, may be condensed, to form a ring.

Examples of the ring structure formed by the substituents include a five- or six-membered aliphatic or aromatic ring. The ring structure may also be a heterocycle containing an atom or atoms other than carbon. The rings formed may also combine to form a fused ring such as a dinuclear ring. The ring structure may also have a substituent, examples of which include those of the monovalent substituent represented by any of $R^1$ to $R^8$ in Formula (I). When a heterocyclic structure is formed, the heteroatom is, for example, N, O or S.

The compound represented by Formula (II-B) has a higher solubility than the compound represented by Formula (I-B) described above, and, therefore, the former is preferred in view of ejection stability. Among the compounds represented by Formula (II-B) above, the sensitizing dye represented by Formula (IV), (V) or (VI) below is preferred in view of availability of starting materials and easiness of the synthesis. The compound represented by Formula (IV), (V) or (VI) is a novel compound which is particularly useful for the ink composition of the invention.

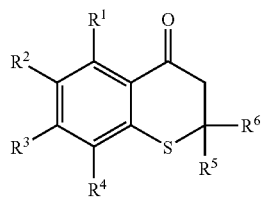

(IV)

In Formula (IV), $R^1$, $R^2$, $R^3$, and $R^4$ each independently represent a hydrogen atom, alkyl or a halogen atom, $R^5$ and $R^6$ each independently represent a hydrogen atom or methyl, and any one of $R^1$, $R^2$, $R^3$, and $R^4$ is —$X^3$ (preferably, $R^2$ is —$X^3$), wherein —$X^3$ is a monovalent substituent selected from the following groups. In each formula below, the mark "*" indicates the position bonded to the heterocycle.

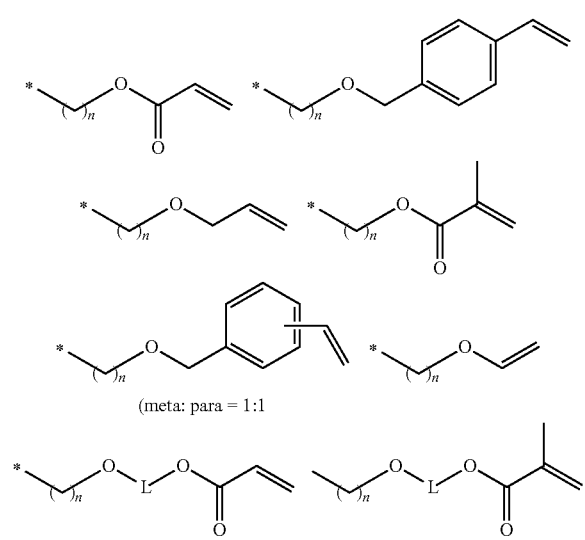

(meta: para = 1:1)

In the groups, n represents 0 or 1, and L represents a divalent linking group comprising one or more linking units selected from the group consisting of alkylene, alkyleneoxy and ester. In each formula above, the mark "*" indicates the position bonded to the heterocycle.

Preferred examples of the linking group L include the structures shown below. When the linking group is asymmetric, it may link in any direction.

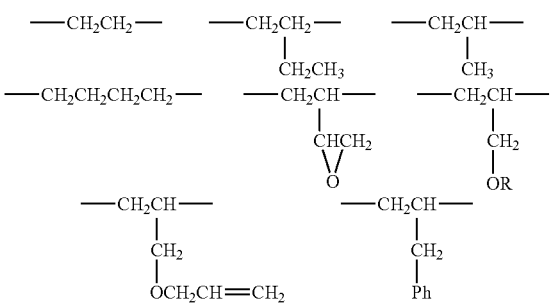

R represents alkyl having 1 to 18 carbon atoms.

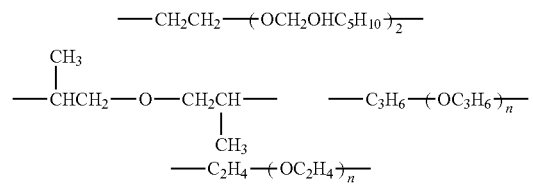

n represents an integer of from 1 to 12.

L is more preferably any of the following structures:

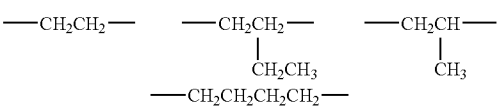

$X^3$ is most preferably any of the following structures.

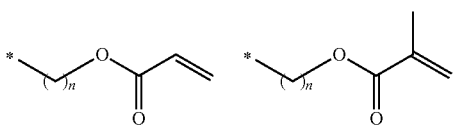

In each formula above, the mark "*" indicates the position bonded to the heterocycle.

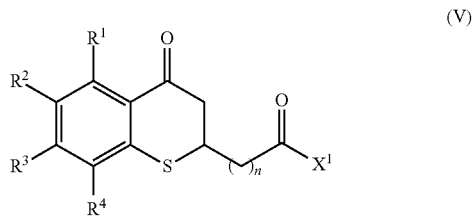

(V)

In Formula (V), $R^1$, $R^2$, $R^3$, and $R^4$ each independently represent a hydrogen atom, alkyl, alkoxy, or a halogen atom, the substituent is preferably introduced at the position of $R^2$, the substituent is preferably alkyl or a halogen atom, more preferably methyl or chloro, n represents 0 or 1, and preferably 0, and $X^1$ represents a monovalent substituent selected from the following groups.

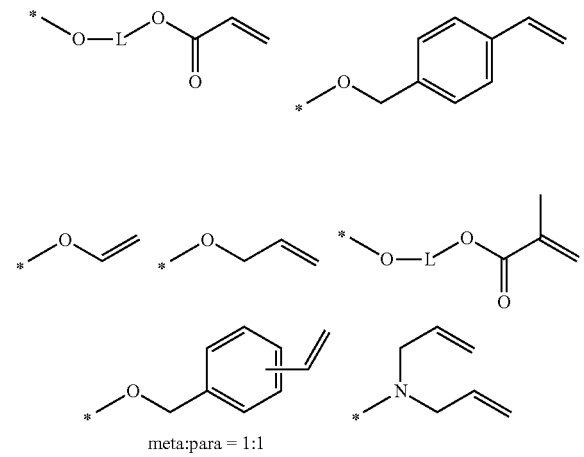

In each formula above, the mark "*" indicates the position bonded to the heterocycle.

L represents a divalent linking group comprising one or more linking units selected from the group consisting of alkylene, alkyleneoxy and ester. Preferred examples of the linking group L include the structures shown below. When the linking group is asymmetric, it may link in any direction.

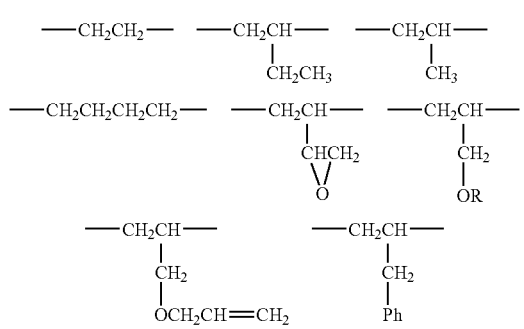

R represents alkyl having 1 to 18 carbon atoms.

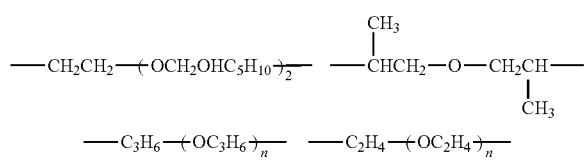

n represents an integer of from 1 to 12.

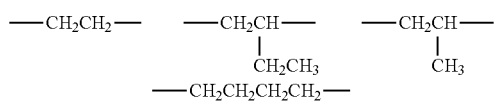

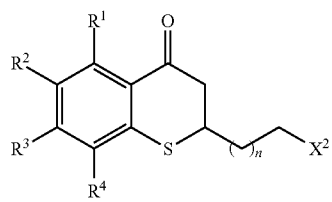

(VI)

In Formula (VI), $R^1$, $R^2$, $R^3$, and $R^4$ each independently represent a hydrogen atom, alkyl, alkoxy, or a halogen atom, the substituent is preferably introduced at the position of $R^2$, the substituent is preferably alkyl or a halogen atom, and more preferably methyl or chloro, n represents 0 or 1, and preferably 0, and $X^2$ represents a monovalent substituent selected from the following groups.

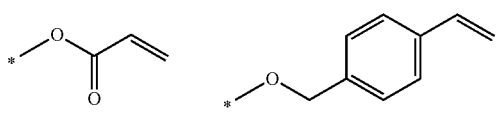

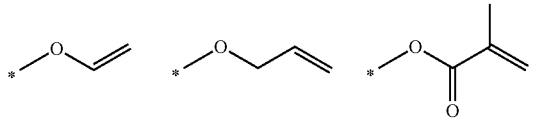

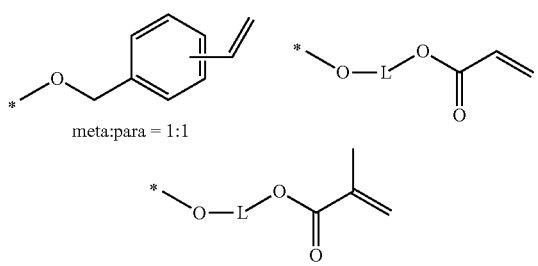

L represents a divalent linking group comprising one or more linking units selected from the group consisting of alkylene, alkyleneoxy and ester. Preferred examples of the linking group L include the structures shown below. When the linking group is asymmetric, it may link in any direction. The mark "*" indicates the position bonded to the heterocycle.

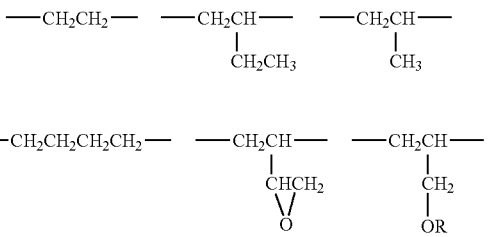

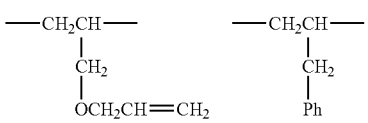

R represents alkyl having 1 to 18 carbon atoms.

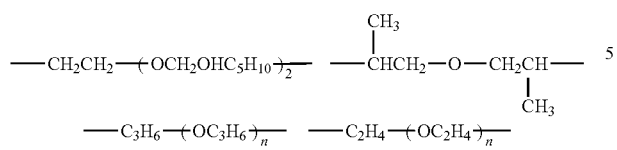

n represents an integer of from 1 to 12.
L is more preferably any of the following structures:

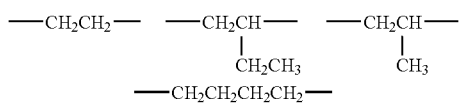

$X^1$ is most preferably any of the following structures.

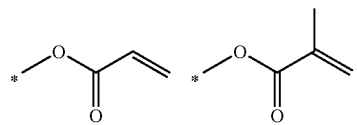

The mark "*" indicates the position bonded to the heterocycle.

Examples of the specific sensitizing dye that may be preferably used in an embodiment of the invention include, but are not limited to, the compounds shown below (Illustrative Compounds (I-1) to (I-23) each corresponding to the compound represented by Formula (I) and Illustrative Compounds (II-1) to (II-82) each corresponding to the compound represented by Formula (II)).

(I-1)
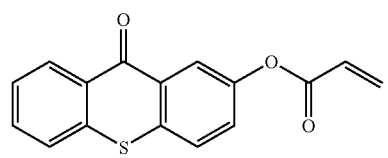

(I-2)
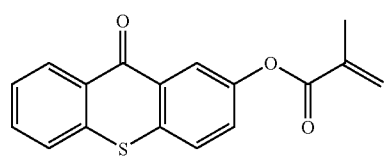

(I-3)
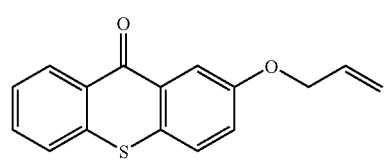

(I-4)
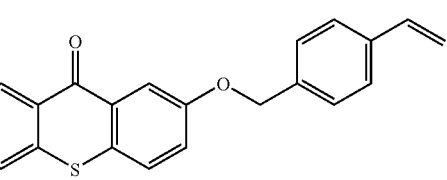

(I-5)
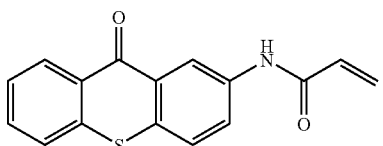

(I-6)
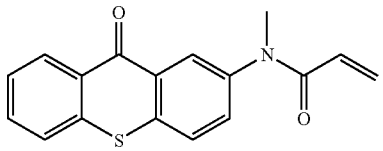

(I-7)
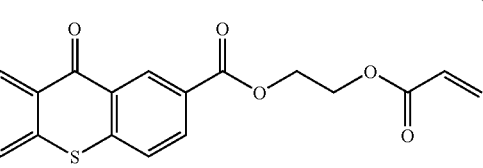

(I-8)
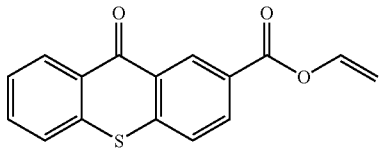

(I-9)
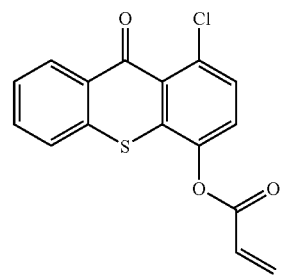

(I-10)
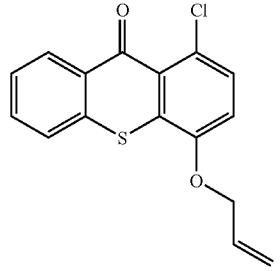

(I-11)
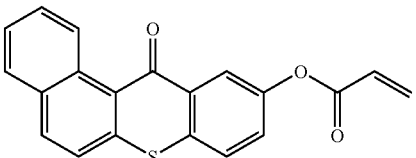

(I-12)
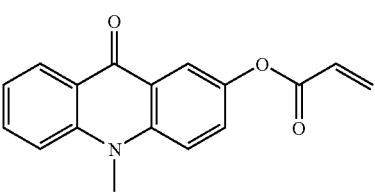

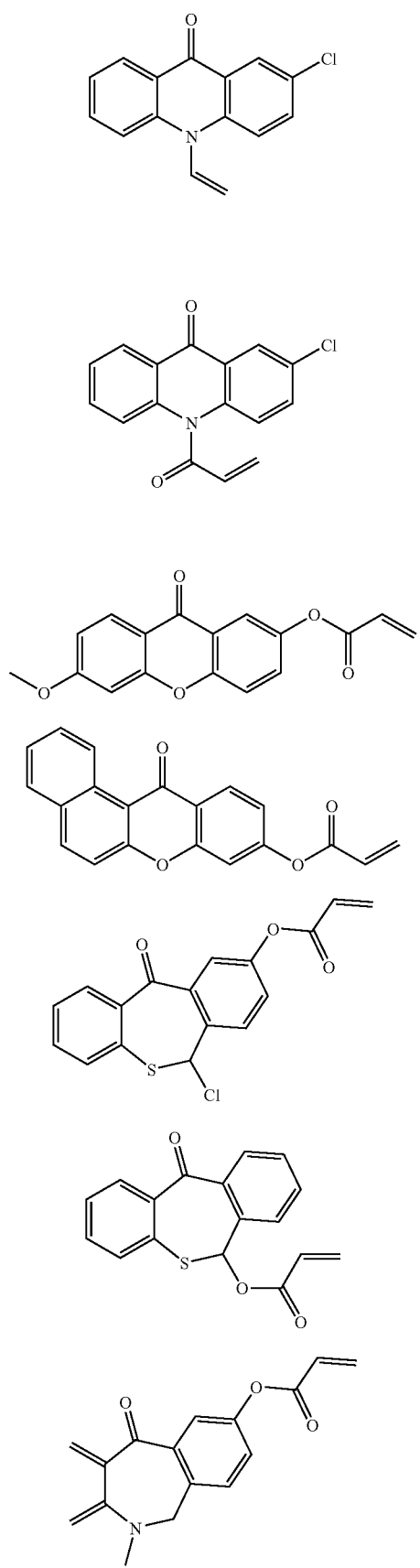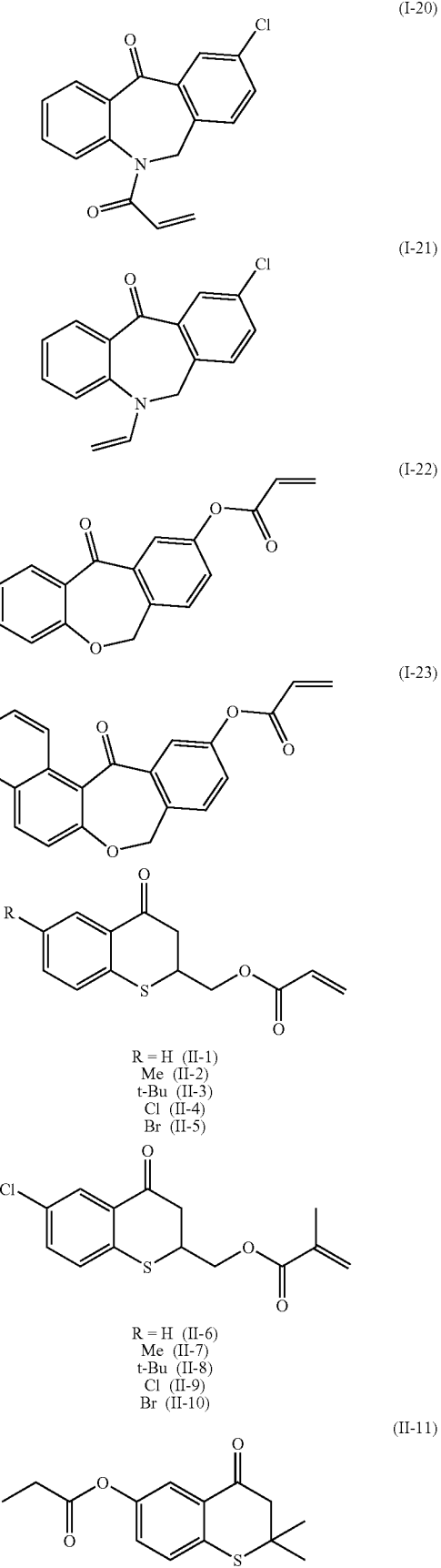

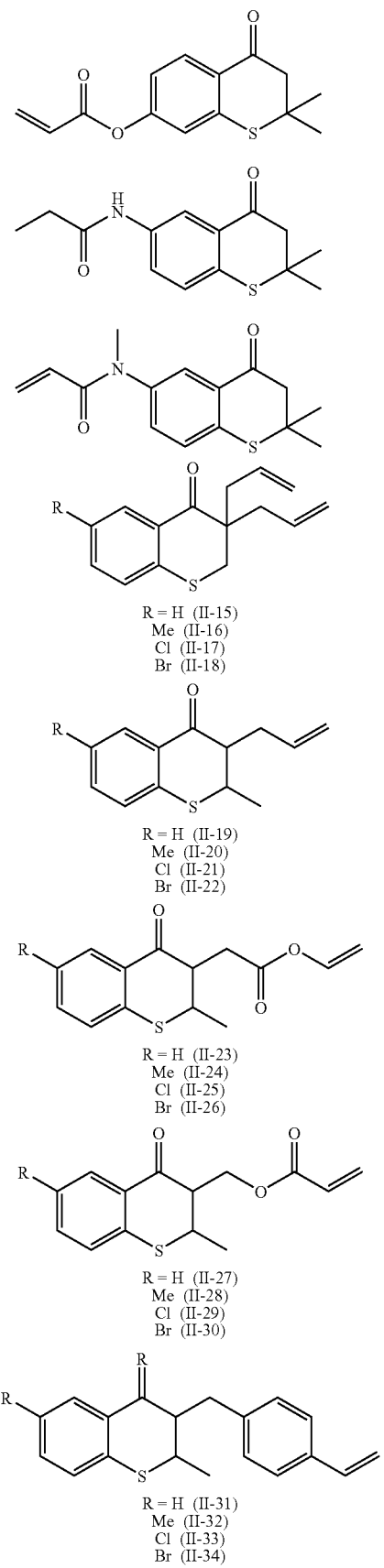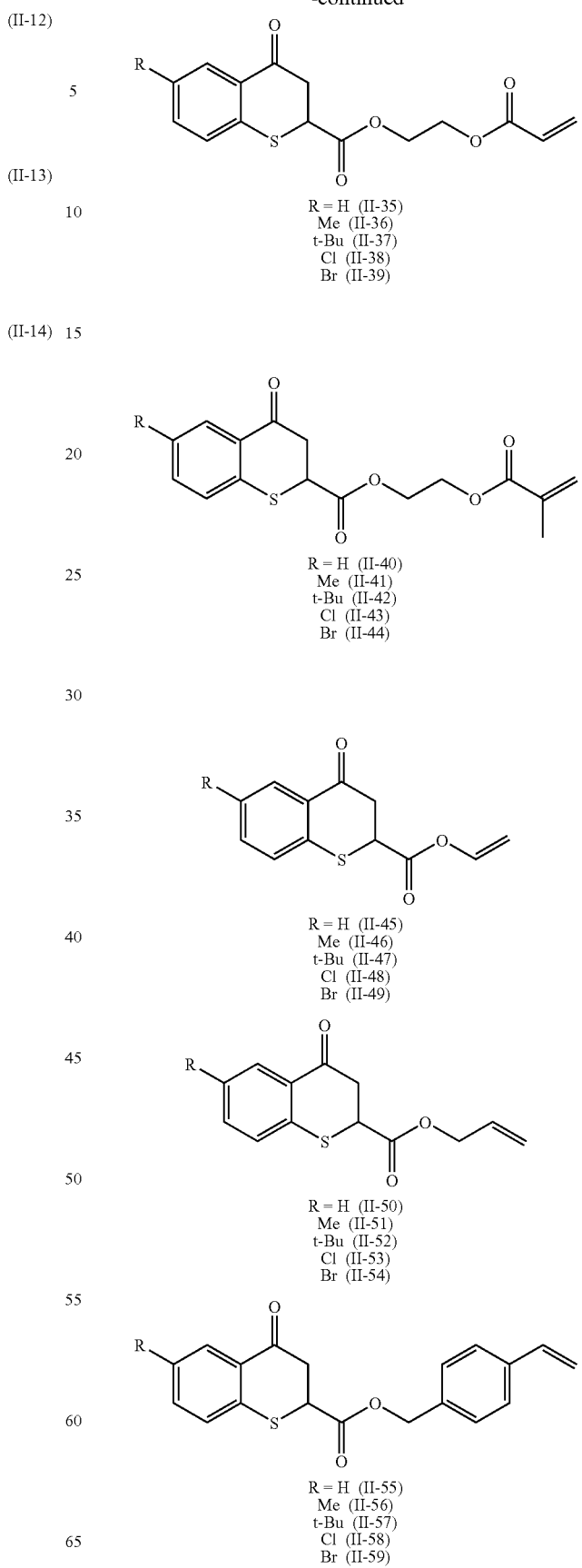

-continued
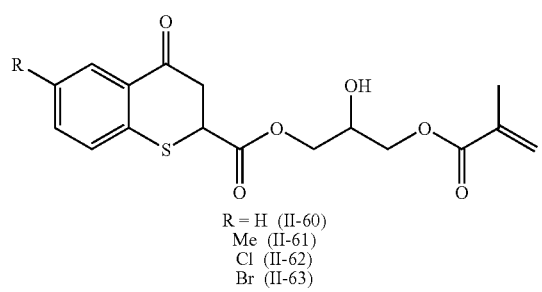
R = H (II-60)
Me (II-61)
Cl (II-62)
Br (II-63)
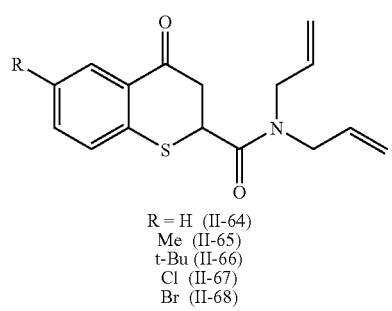
R = H (II-64)
Me (II-65)
t-Bu (II-66)
Cl (II-67)
Br (II-68)
(II-69)
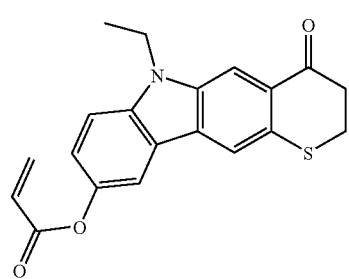
(II-69)
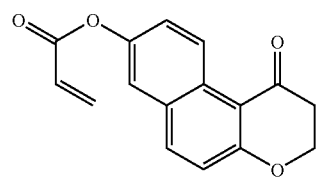
(II-70)
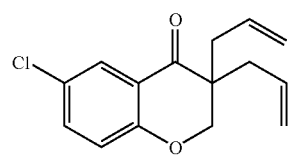
(II-71)
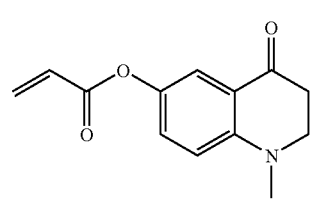
(II-72)
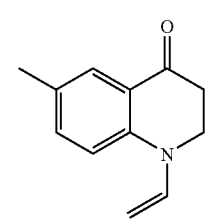
-continued
(II-73)
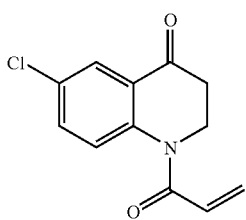
(II-74)
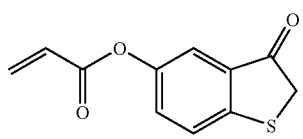
(II-75)
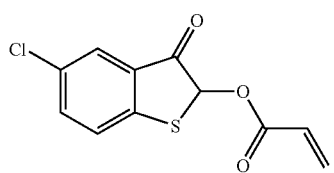
(II-76)
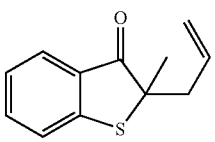
(II-77)
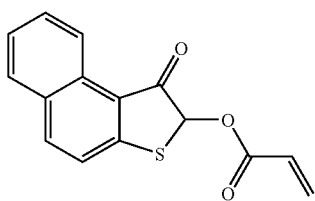
(II-78)
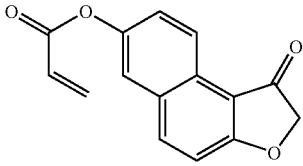
(II-79)
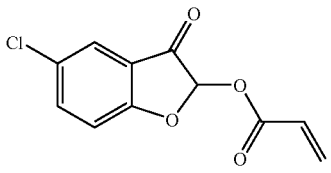
(II-80)
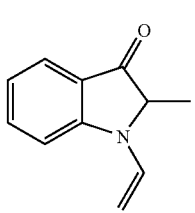

-continued

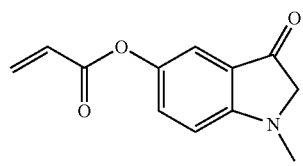

(II-81)

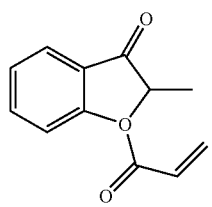

(II-82)

Specific examples of the compound represented by Formula (IV) (Illustrative Compounds (IV-1) to (IV-36)) are illustrated below using their skeletons and substituents.

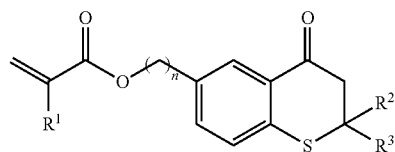

| | |
|---|---|
| n = 0, R$^1$ = H, R$^2$ = H, R$^3$ = H | (IV-1) |
| n = 0, R$^1$ = H, R$^2$ = H, R$^3$ = Me | (IV-2) |
| n = 0, R$^1$ = H, R$^2$ = Me, R$^3$ = Me | (IV-3) |
| n = 0, R$^1$ = Me, R$^2$ = H, R$^3$ = H | (IV-4) |
| n = 0, R$^1$ = Me, R$^2$ = H, R$^3$ = Me | (IV-5) |
| n = 0, R$^1$ = Me, R$^2$ = Me, R$^3$ = Me | (IV-6) |
| n = 1, R$^1$ = H, R$^2$ = H, R$^3$ = H | (IV-7) |
| n = 1, R$^1$ = H, R$^2$ = H, R$^3$ = Me | (IV-8) |
| n = 1, R$^1$ = H, R$^2$ = Me, R$^3$ = Me | (IV-9) |
| n = 1, R$^1$ = Me, R$^2$ = H, R$^3$ = H | (IV-10) |
| n = 1, R$^1$ = Me, R$^2$ = H, R$^3$ = Me | (IV-11) |
| n = 1, R$^1$ = Me, R$^2$ = Me, R$^3$ = Me | (IV-12) |

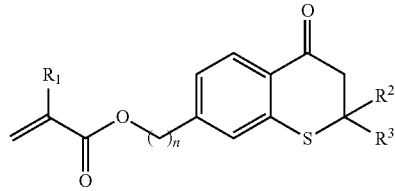

| | |
|---|---|
| n = 0, R$^1$ = H, R$^2$ = H, R$^3$ = H | (IV-13) |
| n = 0, R$^1$ = H, R$^2$ = H, R$^3$ = Me | (IV-14) |
| n = 0, R$^1$ = H, R$^2$ = Me, R$^3$ = Me | (IV-15) |
| n = 0, R$^1$ = Me, R$^2$ = H, R$^3$ = H | (IV-16) |
| n = 0, R$^1$ = Me, R$^2$ = H, R$^3$ = Me | (IV-17) |
| n = 0, R$^1$ = Me, R$^2$ = Me, R$^3$ = Me | (IV-18) |
| n = 1, R$^1$ = H, R$^2$ = H, R$^3$ = H | (IV-19) |
| n = 1, R$^1$ = H, R$^2$ = H, R$^3$ = Me | (IV-20) |
| n = 1, R$^1$ = H, R$^2$ = Me, R$^3$ = Me | (IV-21) |
| n = 1, R$^1$ = Me, R$^2$ = H, R$^3$ = H | (IV-22) |
| n = 1, R$^1$ = Me, R$^2$ = H, R$^3$ = Me | (IV-23) |
| n = 1, R$^1$ = Me, R$^2$ = Me, R$^3$ = Me | (IV-24) |

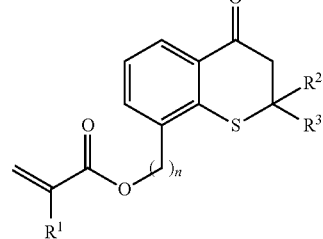

| | |
|---|---|
| n = 0, R$^1$ = H, R$^2$ = H, R$^3$ = H | (IV-25) |
| n = 0, R$^1$ = H, R$^2$ = H, R$^3$ = Me | (IV-26) |
| n = 0, R$^1$ = H, R$^2$ = Me, R$^3$ = Me | (IV-27) |
| n = 0, R$^1$ = Me, R$^2$ = H, R$^3$ = H | (IV-28) |
| n = 0, R$^1$ = Me, R$^2$ = H, R$^3$ = Me | (IV-29) |
| n = 0, R$^1$ = Me, R$^2$ = Me, R$^3$ = Me | (IV-30) |
| n = 1, R$^1$ = H, R$^2$ = H, R$^3$ = H | (IV-31) |
| n = 1, R$^1$ = H, R$^2$ = H, R$^3$ = Me | (IV-32) |
| n = 1, R$^1$ = H, R$^2$ = Me, R$^3$ = Me | (IV-33) |
| n = 1, R$^1$ = Me, R$^2$ = H, R$^3$ = H | (IV-34) |
| n = 1, R$^1$ = Me, R$^2$ = H, R$^3$ = Me | (IV-35) |
| n = 1, R$^1$ = Me, R$^2$ = Me, R$^3$ = Me | (IV-36) |

These specific polymerizable compounds each have a heterocyclic structure moiety functioning as a sensitizing dye. Therefore, they are each useful as the sensitizing dye to be added to the curable composition. They are each effective as a sensitizing dye in facilitating the decomposition of the polymerization initiator upon exposure with active rays. In addition, they are each particularly effective in reducing bleeding, that is a specific phenomenon which a low molecular weight component has, because they each have a radically-reactive polymerizable group so that they can be each immobilized in a cured film formed upon energy application.

The specific polymerizable compound of the invention is useful as a sensitizing dye, particularly useful as a sensitizing dye for ultraviolet-curable ink compositions confronting the problem of surface stickiness.

The specific sensitizing dye represented by Formula (I) may be synthesized by known methods such as the methods described in ES2015341, JP-A No. 1978-12896, Synth. Commun., vol. 19, page 3349 (1989), and Helv. Chim. Acta. GE, vol. 45, page 1860 (1962).

Typical examples of the method for synthesizing the specific sensitizing dye represented by Formula (II) are shown below.

SYNTHESIS EXAMPLES

Synthesis examples and identification data are shown below for the specific polymerizable compound of the invention.

Synthesis Example 1

A typical method for synthesizing the specific polymerizable compound represented by Formula (IV) is shown below.
[Synthesis of Illustrative Compound (IV-3)]
In 10 ml of 2-butanone was dissolved 2.08 g of Compound A having the structure shown below, and 1.11 g of triethylamine was added to the solution. The mixture was then cooled to 0° C. with a cooling bath, and 1.00 g of acryloyl chloride was added slowly. The mixture was then warmed to room temperature and stirred for 3 hours. After the reaction was completed, water was added to the reaction liquid, and the mixture was extracted with ethyl acetate. The extract was washed with a saturated aqueous sodium chloride solution and dried over magnesium sulfate. After filtration, the filtrate was concentrated with an evaporator. The concentrated filtrate was purified with a silica gel column (eluent: hexane/ethyl acetate), resulting in 1.8 g of the desired compound (IV-3).

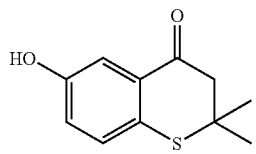

Compound A

NMR (300 MHz, CDCl3, δ(ppm)): 8.06 (1H, d, J=2.4 Hz), 7.35 (1H, dd, J=2.4 Hz, 8.4 Hz), 7.17 (1H, d, J=8.4 Hz), 6.52 (1H, dd, J=1.5 Hz, 17.1 Hz), 6.12 (1H, dd, J=10.5 Hz, 17.1 Hz), 5.96 (1H, dd, J=1.5 Hz, 10.5 Hz), 2.87 (2H, s), 1.46 (6H, s)

Compound A can be synthesized using the method which is described in Bioorganic & Medicinal Chemistry (1999),7(7), 1321-1338.

The synthetic scheme is shown below.

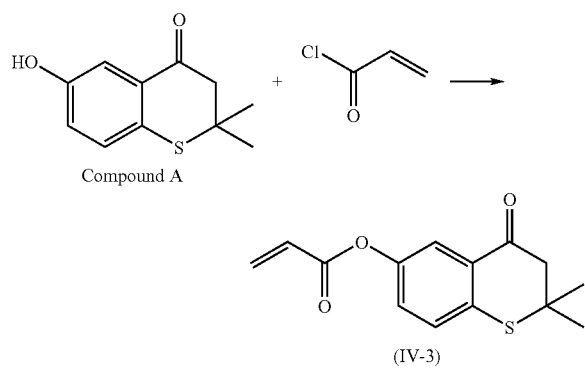

A typical method for synthesizing the specific polymerizable compound represented by Formula (II) is shown below.

[Synthesis of Illustrative Compound (II-38)]

In 20 ml of THF were dissolved 2.42 g of Compound B having the structure shown below and 0.10 g of DMAP (dimethylaminopyridine), and 2.32 g of Compound C was added to the solution. The mixture was cooled to 0° C. with a cooling bath, and DCC (dicyclohexylcarbodiimide) was added slowly. The mixture was then warmed to room temperature and stirred for 3 hours. After the reaction was completed, water was added to the reaction liquid, and the mixture was extracted with ethyl acetate. The extract was washed with dilute hydrochloric acid and a saturated aqueous sodium chloride solution and dried over magnesium sulfate. After filtration, the filtrate was concentrated with an evaporator. The concentrated filtrate was purified with a silica gel column (eluent: hexane/ethyl acetate), resulting in 2.8 g of the desired compound (II-38).

Compound (II-38): NMR (300 MHz, CDCl3, δ(ppm)): 8.08(1H,d,J=2.4 Hz),7.36(1H,dd,J=2.4 Hz,8.4 Hz),7.18(1H,d,J=8.4 Hz),6.40(1H,dd,J=1.5 Hz,17.1 Hz),6.07(1H,dd,J=10.5 Hz,17.1 Hz),5.87(1H,dd,J=1.5 Hz,10.5 Hz),4.34(4H,m),4.13(1H,m)3.18(2H,m)

Compound B can be synthesized by the method described in JP-A No. 02-255677.

The synthetic scheme is shown below.

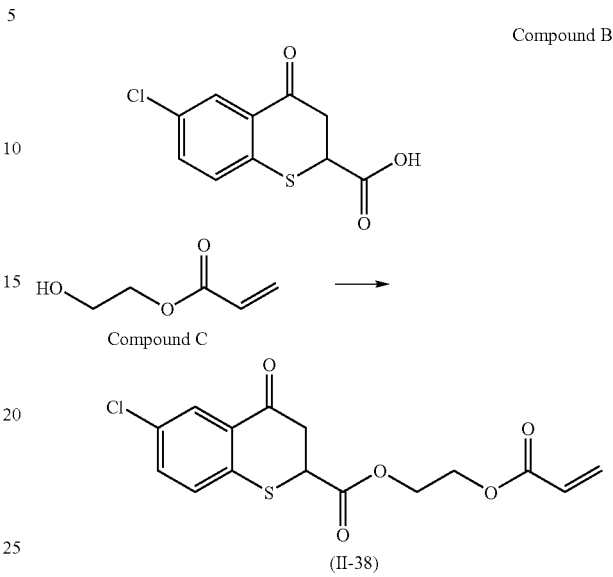

Synthesis Example 3

[Synthesis of Illustrative Compound (II-53)]

In 100 ml of DMF were dissolved 2.42 g of Compound B having the structure shown below and 2.0 g of $K_2CO_3$. The solution was cooled to 0° C. with a cooling bath, and 2.0 g of allyl bromide was slowly added dropwise to the solution. The mixture was then warmed to room temperature and stirred for 3 hours. After the reaction was completed, the reaction liquid was poured into water, and the solid product was separated by filtration. The solid was recrystallized with ethyl acetate and hexane to give 2.2 g of the desired compound (II-53).

Compound (II-53): NMR (300 MHz, CDCl3, δ(ppm)): 8.09(1H,d,J=2.1 Hz),7.37(1H,dd,J=2.1 Hz,8.4 Hz),7.20(1H,d,J=8.4 Hz),5.82(1H,m),5.26(2H,m), 4.62(2H,d,J=5.7 Hz), 4.14(1H,t,J=5.4 Hz),3.19(1H,d,J=5.4 Hz)

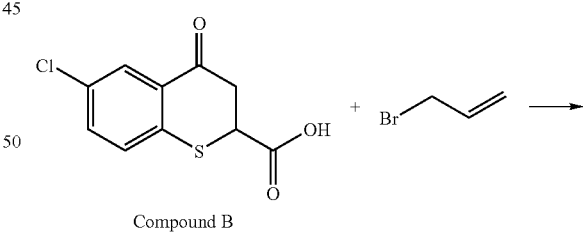

Compound B

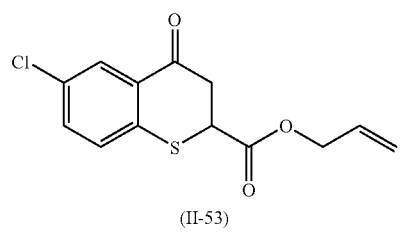

(II-53)

Synthesis Example 4

[Synthesis of Illustrative Compound (II-58)]

In 100 ml of DMF were dissolved 24.3 g of Compound B having the structure shown below, 27.6 g of K$_2$CO$_3$ and 8.3 g of potassium iodide. The solution was cooled to 0° C. with a cooling bath, and 14.4 g of p-chlorovinylstyrene was slowly added dropwise. The mixture was then warmed to room temperature and stirred for 3 hours. After the reaction was completed, the reaction liquid was poured into water, and the mixture was extracted with ethyl acetate. The extract was washed with dilute hydrochloric acid and a saturated aqueous sodium chloride solution and dried over magnesium sulfate. After filtration, the filtrate was concentrated with an evaporator. The precipitated solid was recrystallized with ethyl acetate and hexane to give 12.0 g of the desired compound (II-58).

Compound (II-58): NMR (300 MHz, CDCl3, β(ppm)): 8.05(1H,d,J=2.4 Hz),7.34(3H,m),7.17(3H,m),6.70(1H,dd,J=10.8 Hz,17.4 Hz),5.76(1H,dd,J=0.6 Hz,17.4 Hz),5.28(1H,dd,J=0.6 Hz,10.8 Hz),5.12(2H,m),4.12(1H,m)3.18(2H,m)

The synthetic scheme is shown below.

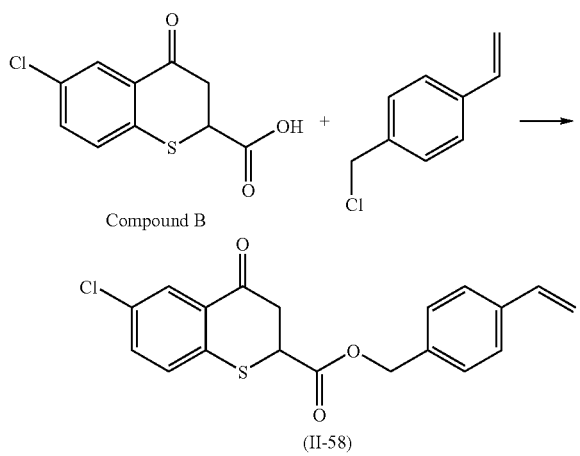

Synthesis Example 5

[Synthesis of Illustrative Compound (II-4)]

In 200 ml of EtOH were dissolved 24.2 g of Compound B having the structure shown below and 1.0 g of DMAP (dimethylaminopyridine). The solution was cooled to 0° C. with a cooling bath, and 22.7 g of DCC (dicyclohexylcarbodiimide) was added slowly. The mixture was then warmed to room temperature and stirred for 3 hours. After the reaction was completed, water was added to the reaction liquid, and the mixture was extracted with ethyl acetate. The extract was washed with dilute hydrochloric acid and a saturated aqueous sodium chloride solution and dried over magnesium sulfate. After filtration, the filtrate was concentrated with an evaporator. The concentrated filtrate was purified with a silica gel column (eluent: hexane/ethyl acetate), resulting in 20.5 g of Compound D.

Compound D: NMR (300 MHz, CDCl3, δ(ppm)): 8.08 (1H,d,J=2.4 Hz),7.36(1H,dd,J=2.4 Hz,8.4 Hz),7.19(1H,d, J=8.4 Hz),4.18(2H,m),4.11(1H,t,J=5.4 Hz)3.17(2H,d,J=5.4 Hz),3.17(3H,t,J=7.2 Hz)

The synthetic scheme is shown below.

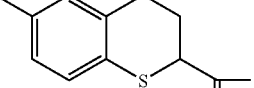

In 250 ml of toluene, 17.2 g of Compound D and 14.3 ml of ethylene glycol were subjected to azeotrop distillation with 1.28 g of p-toluenesulfonic acid monohydrate as a catalyst. After 24 hours, the cooled solution was washed twice with 100 ml of 0.50 M sodium hydroxide and then twice with 100 ml of water. The organic phase wad dried over anhydrous magnesium sulfate. The solvent was entirely removed with a rotary evaporator so that a light yellow liquid was obtained. To a flask were added 1.40 g of LiAlH$_4$ and 60 ml of THF, and the obtained light yellow liquid was slowly added dropwise. After the mixture was stirred for 3 hours, the consumption of the light yellow liquid was checked by TLC. The mixture was then cooled to 0° C. with a cooling bath, and water was slowly added dropwise. After the reaction liquid was filtered, 15 ml of 1N hydrochloric acid was added to the filtrate and stirred for 24 hours. Water was then added to the reaction liquid, and the mixture was extracted with ethyl acetate. The extract was washed with a saturated aqueous sodium chloride solution and dried over magnesium sulfate. After filtration, the filtrate was concentrated with an evaporator. The concentrated filtrate was purified with a silica gel column (eluent: hexane/ethyl acetate), resulting in 12.5 g of the desired Compound E.

Compound E: NMR (300 MHz, CDCl3, δ(ppm)): 8.03(1H, d,J=2.4 Hz),7.36(1H,dd,J=2.4 Hz,8.4 Hz),7.23(1H,d,J=8.4 Hz),3.83(2H,dd,J=2.4 Hz,6.3 Hz),3.65(1H,m),3.12(1H,dd, J=4.2 Hz,16.8 Hz),2.99(1H,dd,J=8.1 Hz,16.8 Hz)

The synthetic scheme is shown below.

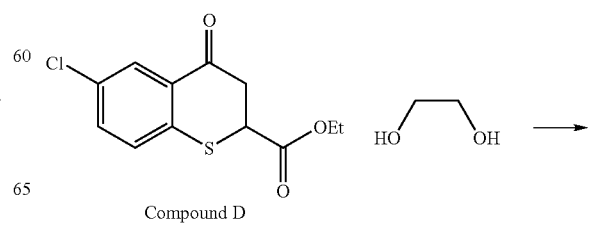

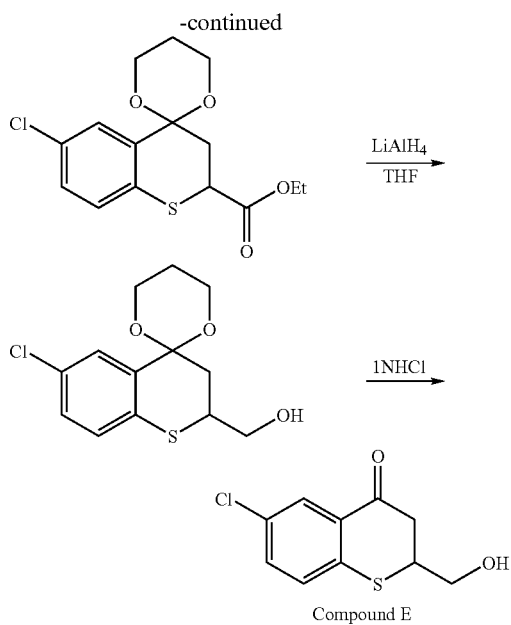

Compound E

In 50 ml of 2-butanone was dissolved 12.0 g of Compound E, and 5.85 g of triethylamine was added to the solution. The mixture was then cooled to 0° C. with a cooling bath, and 5.22 g of acryloyl chloride was added slowly. The mixture was then warmed to room temperature and stirred for 3 hours. After the reaction was completed, water was added to the reaction liquid, and the mixture was extracted with ethyl acetate. The extract was washed with a saturated aqueous sodium chloride solution and dried over magnesium sulfate. After filtration, the filtrate was concentrated with an evaporator. The concentrated filtrate was purified with a silica gel column (eluent: hexane/ethyl acetate), resulting in 8.5 g of the desired compound (II-4).

The synthetic scheme is shown below.

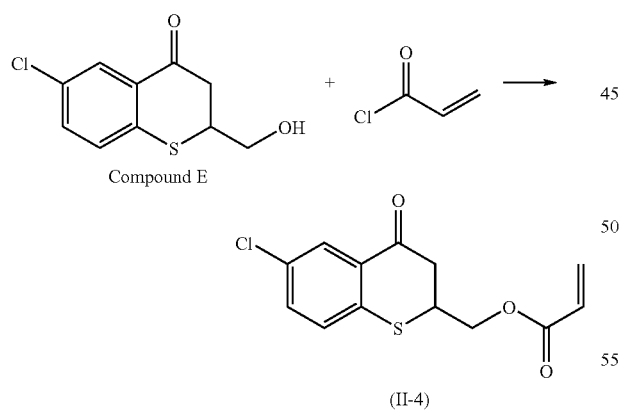

(II-4)

Compounds other than those described above can also be synthesized by a combination of known reactions similar to the production methods described above.

The content of (i) the specific sensitizing dye in the ink composition of the invention is from about 0.05% by weight to about 30% by weight, preferably from 0.5% by weight to 25% by weight, and more preferably from 1.0% by weight to 20% by weight, based on the solid content of the ink composition.

Concerning the content of the specific sensitizing dye relative to (ii) the polymerization initiator, the weight ratio of (ii) the polymerization initiator to (i) the specific sensitizing dye is from 200:1 to 1:200, preferably from 50:1 to 1:50, and more preferably from 5:1 to 1:5.

[Additional Sensitizing Dye]

In the invention, the specific sensitizing dye may be used in combination with any known sensitizing dye which does not have a polymerizable group, as long as the effects of the invention are not reduced. The weight ratio of the specific sensitizing dye to such an additional sensitizing dye is from 1:5 to 100:1, preferably from 1:1 to 100:1, and more preferably from 2:1 to 100:1.

Examples of known sensitizing dyes that may be used in combination with the specific sensitizing dye include benzophenones, thioxanthones, especially isopropylthioxanthone, thiochromanones, dibenzothiepinones, anthraquinones and 3-acylcoumarin derivatives, terphenyls, styryl ketones, 3-(aroylmethylene)thiazolines, camphorquinone, eosin, rhodamine, and erythrosine.

Examples of the photosensitizer that may be used in combination with the sensitizing dye further include:

(1) thioxanthones such as thioxanthone, 2-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di-[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboxyimide, n-octylthioxanthone-3,4-dicarboxyimide, N-(1,1,3,3-tetramethylbutyl)thioxanthone-3,4-dicarboxyimide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propanaminium chloride;

(2) thiochromanones such as the compounds previously proposed by the inventors and described in Japanese Patent Application No. 2007-006019, specifically, the following compounds:

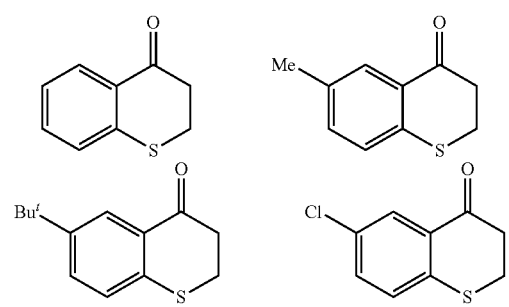

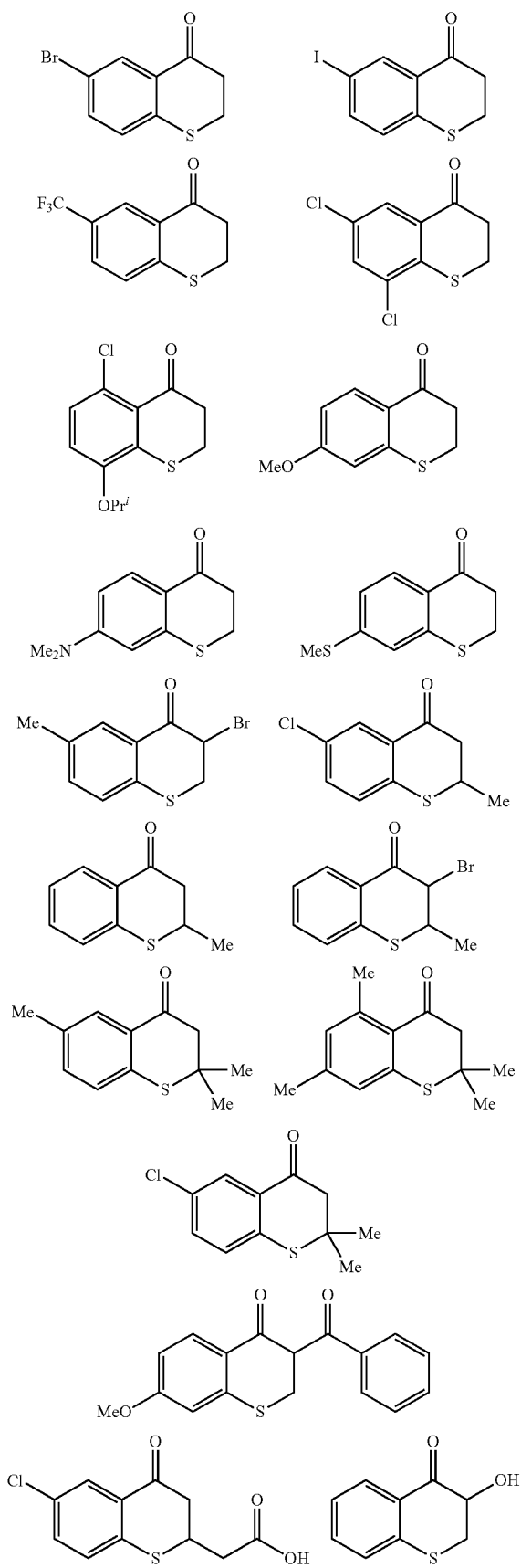
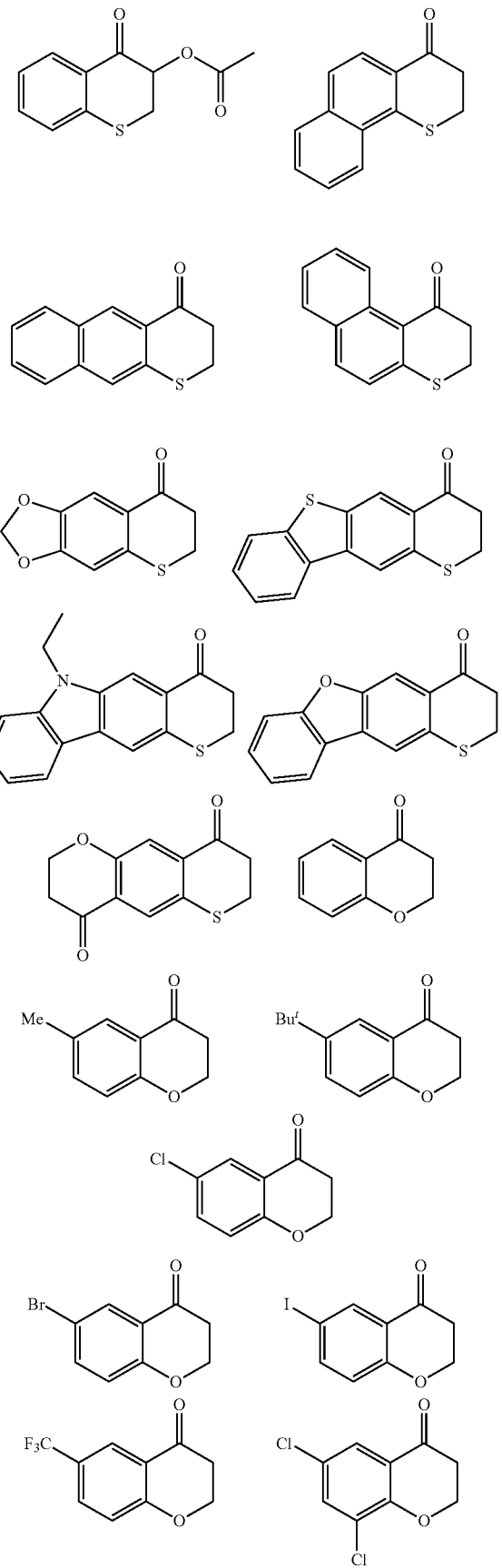

31
-continued
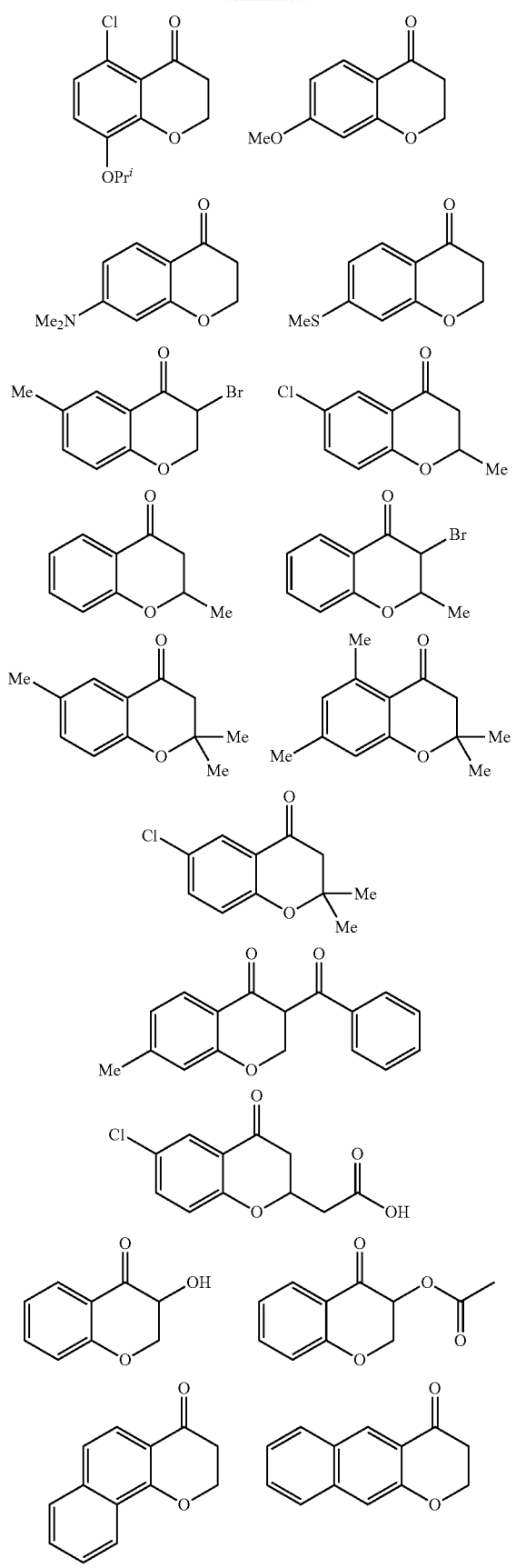
32
-continued
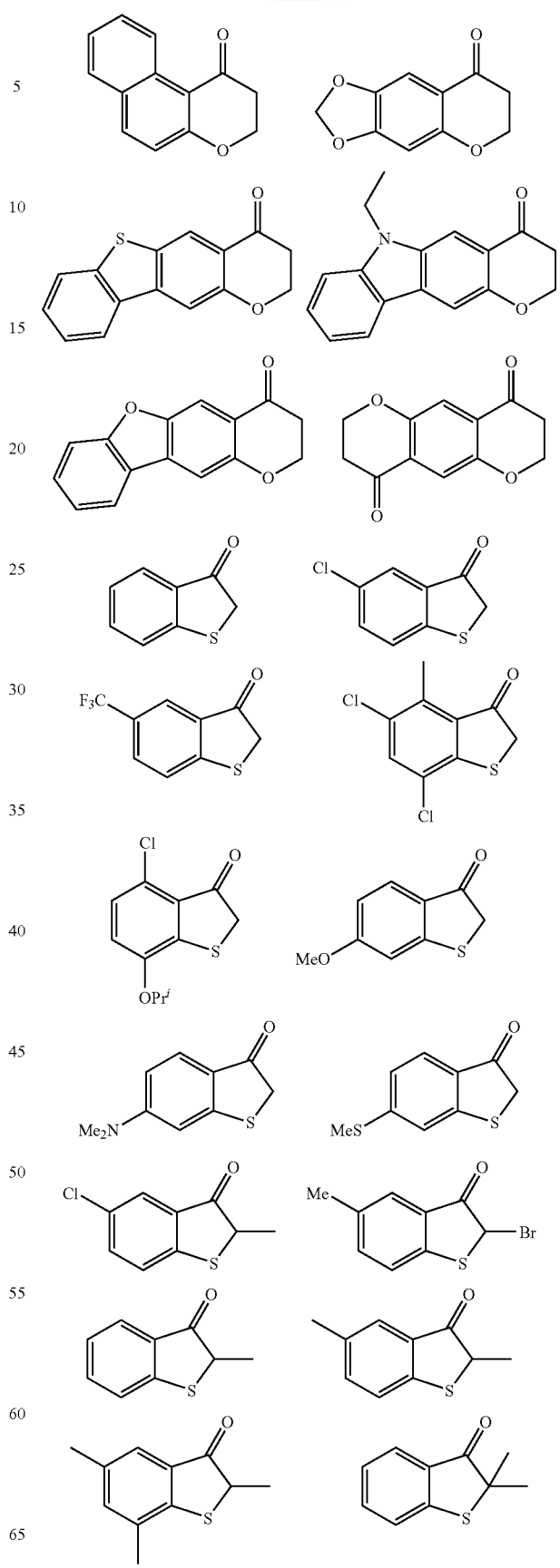

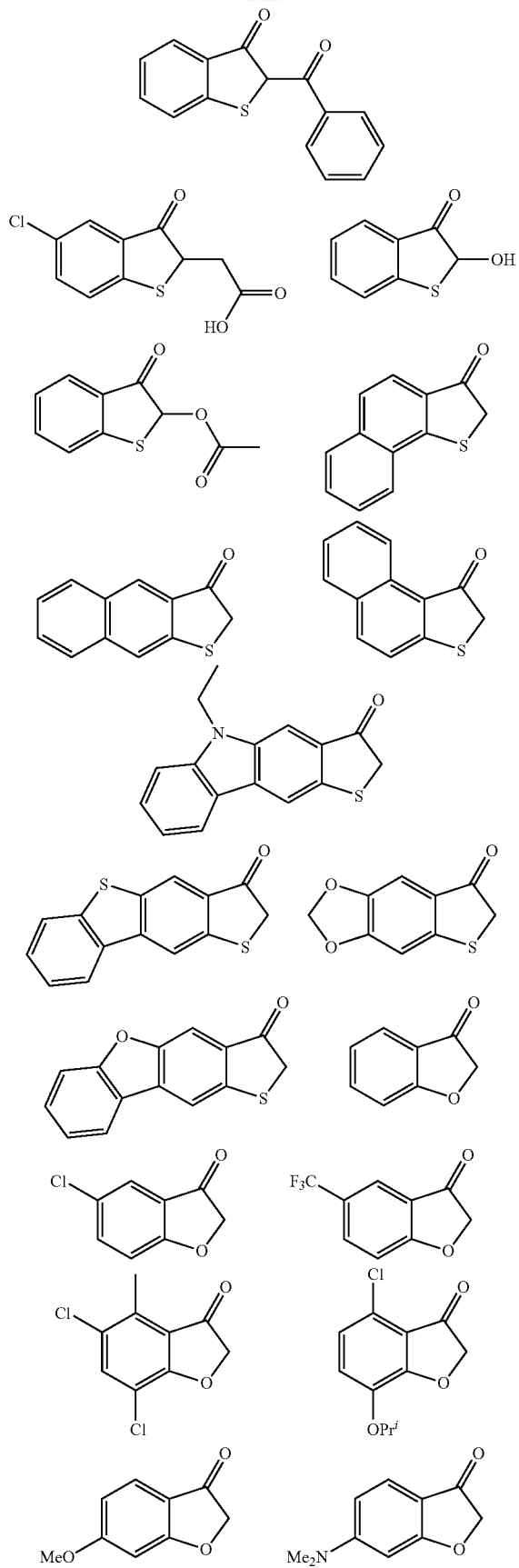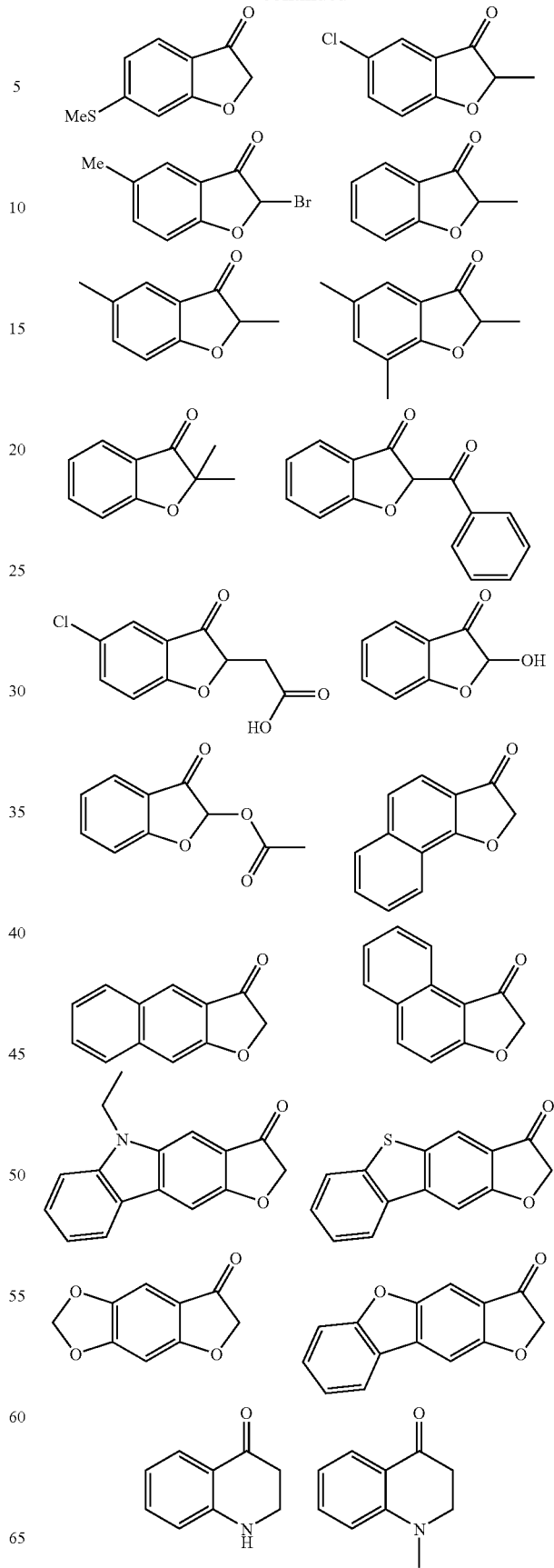

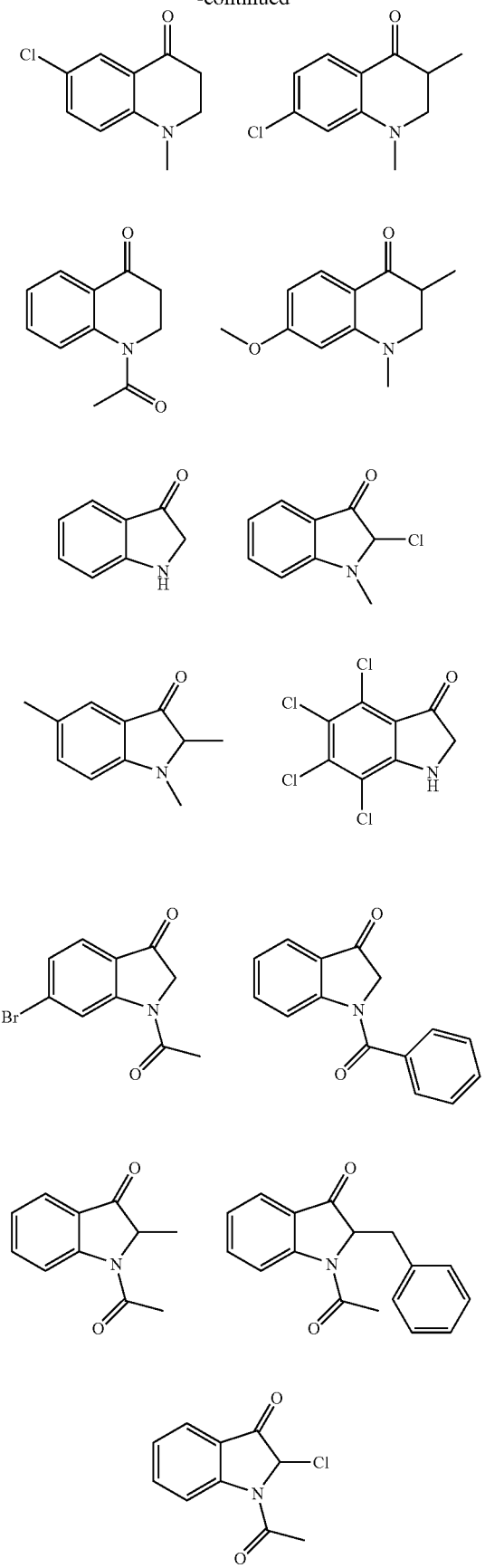
(3) dibenzothiepinones such as the compounds previously proposed by the inventors and described in Japanese Patent Application No. 2007-039491, specifically the following compounds:

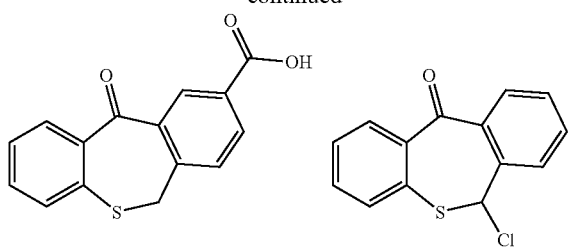
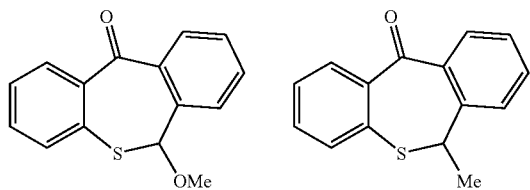
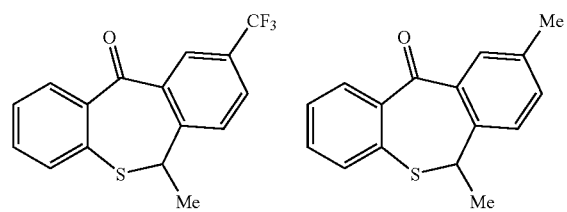
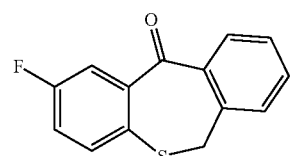
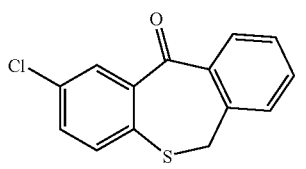
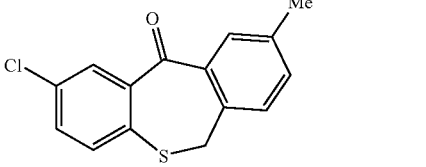
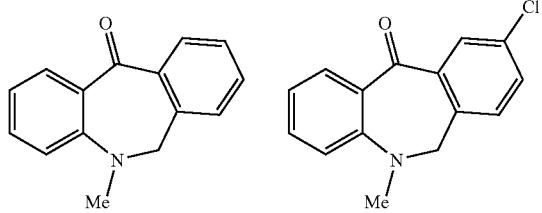
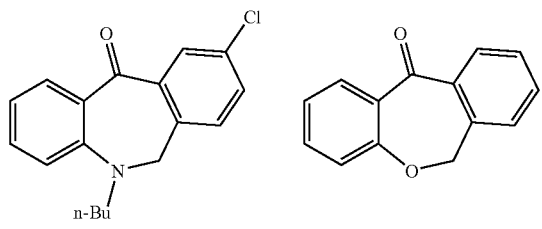

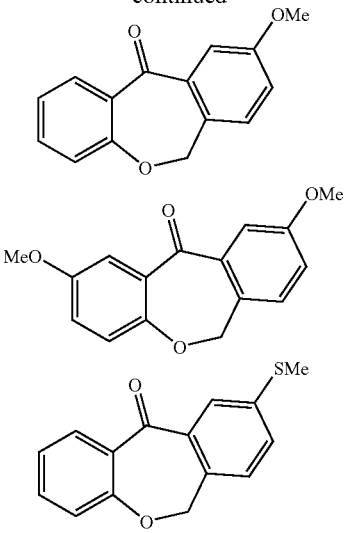

(4) benzophenones such as benzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio)benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, and 4-benzoyl-N,N-dimethyl-N-[2-(1-oxo-2-propenyl)oxy]ethylbenzenemethanaminium chloride;

(5) 3-acylcoumarins such as 3-benzoylcoumarin, 3-benzoyl-7-methoxycoumarin, 3-benzoyl-5,7-di(propoxy)coumarin, 3-benzoyl-6,8-dichlorocoumarin, 3-benzoyl-6-chlorocoumarin, 3,3'-carbonylbis[5,7-di(propoxy)coumarin], 3,3'-carbonylbis(7-methoxycoumarin), 3,3'-carbonylbis(7-diethylaminocoumarin), 3-isobutyloylcoumarin, 3-benzoyl-5,7-dimethoxycoumarin, 3-benzoyl-5,7-diethoxycoumarin, 3-benzoyl-5,7-dibutoxycoumarin, 3-benzoyl-5,7-di(methoxyethoxy)coumarin, 3-benzoyl-5,7-di(allyloxy)coumarin, 3-benzoyl-7-dimethylaminocoumarin, 3-benzoyl-7-diethylaminocoumarin, 3-isobutyloyl-7-dimethylaminocoumarin, 5,7-dimethoxy-3-(1-naphthoyl)coumarin, 5,7-dimethoxy-3-(1-naphthoyl)coumarin, 3-benzoylbenzo[f]coumarin, 7-diethylamino-3-thienoylcoumarin, and 3-(4-cyanobenzoyl)-5,7-dimethoxycoumarin;

(7) 3-(aroylmethylene)thiazolines such as 3-methyl-2-benzoylmethylene-β-naphthothiazoline, 3-methyl-2-benzoylmethylenebenzothiazoline, and 3-ethyl-2-propionylmethylene-β-naphthothiazoline;

(8) anthracenes such as 9,10-dimethoxy-anthracene, 9,10-diethoxy-anthracene and 9,10-dimethoxy-2-ethyl-anthracene; and (9) other carbonyl compounds such as acetophenone, 3-methoxyacetophenone, 4-phenylacetophenone, benzil, 2-acetylnaphthalene, 2-naphthaldehyde, 9,10-naphthoquinone, 9-fluorenone, dibenzosuberone, xanthone, 2,5-bis(4-diethylaminobenzylidene)cyclopentanone, and α-(para-dimethylaminobenzylidene) ketones such as 2-(4- dimethylaminobenzylidene)indan-1-one or 3-(4-dimethylaminophenyl)-1-indan-5-yl-propenone, 3-phenylthiophthalimide, and N-methyl-3,5-di(ethylthio)phthalimide.

<(ii) Polymerization Initiator>

The ink composition of the invention contains a polymerization initiator.

In the invention, as the polymerization initiator according to the invention, any known polymerization initiator may be used. In an embodiment of the invention, a radical polymerization initiator is preferably used.

-Radical Polymerization Initiator-

Examples of radical polymerization initiators that may be preferably used in the invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

Examples of the above radical polymerization initiators includes these described in Paragraphs [0135] to [0208] of JP-A No. 2006-085049.

The radical polymerization initiators may be used alone or in a combination of two or more of them.

In the invention, at least one selected from the group consisting of α-aminoketones and acylphosphine oxides is most preferably used in combination with the specific sensitizing dye.

Examples of compounds belonging to α-aminoketones include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)-butan-1-one. Irgacure series manufactured by Ciba-Geigy Corp., such as Irgacure 907, Irgacure 369 and Irgacure 379 are commercially available products belonging to α-aminoketones and also preferably used in the invention.

Examples of acylphosphine oxide compounds include the compounds disclosed in Japanese Patent Application Publication (JP-B) Nos. 63-40799 and 05-29234 and JP-A Nos. 10-95788 and 10-29997.

The content of (ii) the polymerization initiator in the ink composition of the invention is preferably from 0.1% by weight to 30% by weight, more preferably from 1.0% by weight to 20% by weight, and particularly preferably from 5.0% by weight to 15.0% by weight on the base of solid content.

The amount of (ii) the polymerization initiator in the ink composition of the invention is preferably from 0.01 parts to 35 parts by weight, more preferably from 0.1 parts to 30 parts by weight, and even more preferably from 0.5 parts to 30 parts by weight, with respect to 100 parts by weight of (iii) the polymerizable compound having an ethylenically unsaturated bond described later. In this context, the amount of the polymerization initiator means the total amount of the polymerization initiators including the radical polymerization initiator described above and the other polymerization initiators usable in combination therewith.

<(iii) Ethylenically Unsaturated Bond-Containing Polymerizable Compound>

The ink composition of the present invention contains a polymerizable compound. The polymerizable compound which can be suitably used in the present invention is a radical polymerizable, ethylenically unsaturated bond-containing compound and may be any compound so far as it has at least one radical polymerizable, ethylenically unsaturated bond in a molecule thereof. Examples thereof include compounds having a chemical morphology, for example, a monomer, an oligomer and a polymer.

The radical polymerizable compound may be used singly, or two or more kinds of radical polymerizable compounds may be used jointly in an arbitrary ratio for the purpose of enhancing the desired characteristics. It is preferable that two or more kinds of radical polymerizable compounds are used jointly in view of controlling performances, for example, reactivity and physical properties.

Examples of the ethylenically unsaturated double bond-containing polymerizable compound include unsaturated carboxylic acids (for example, acrylic acid, methacrylic acid, itaconic acid, crotonic acid, isocrotonic acid and maleic acid) and salts thereof; ethylenically unsaturated bond-containing anhydrides; acrylonitrile; styrene; and various radical polymerizable compounds (for example, unsaturated polyesters, unsaturated polyethers, unsaturated polyamides and unsaturated urethanes).

Specific examples thereof include acrylic acid derivatives (for example, 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide and epoxy acrylate); methacrylic acid derivatives (for example, methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate and 2,2-bis (4-methacryloxypolyethoxyphenyl)propane; and besides, allyl compound derivatives (for example, allyl glycidyl ether, diallyl phthalate and triallyl trimellitate).

More concretely, radical polymerizable and crosslinking monomers, oligomers and polymers which are commercially available or known in the art, as described in, for example, Crosslinking Agent Handbook, edited by Shinzo YAMASHITA and published by Taiseisha Ltd. (1981); UV or EB Curing Handbook (Raw Material Volume), edited by Kiyoshi KATO and published by Kobunshi Kankokai (1985); and Application and Market of UV or EB Curing Technology, edited by RadTech Japan and published by CMC Publishing Co., Ltd., page 79 (1989); and Polyester Resin Handbook, written by Eiichiro TAKIYAMA and published by The Nikkan Kogyo Shimbun, Ltd. (1988) can be used.

Examples of the radical polymerizable compound include photocuring type polymerizable compounds which are used for a photopolymerizable composition as described in, for example, JP-A No. 7-159983, JP-B No. 7-31399 and JP-A Nos. 8-224982, 10-863 and 9-134011.

For the purpose of more improving the sensitivity, bleeding and adhesion to a recording medium, it is preferable that a monoacrylate and a polyfunctional acrylate monomer or a polyfunctional acrylate oligomer having a molecular weight of 400 or more, and preferably 500 or more are used jointly. In particular, in an ink composition to be used for recording on a flexible medium to be recorded, for example, a PET film or a PP film, the joint use of the monoacrylate selected from the foregoing compound group and the polyfunctional acrylate monomer or polyfunctional acrylate oligomer is preferable because not only flexibility is imparted to a film, but the film strength is enhanced while enhancing the adhesion.

Furthermore, an embodiment in which at least three kinds of polymerizable compounds of monofunctional, bifunctional and trifunctional or polyfunctional monomers are used jointly is preferable from the viewpoints that the sensitivity, bleeding and adhesion to a medium to be recorded can be more improved while maintaining the safety.

Among the monoacrylates, stearyl acrylate, isoamyl acrylate, isomyristyl acrylate and isostearyl acrylate have high sensitivity and low shrinking properties, thereby preventing the generation of curl. Also, these compounds are preferable in view of prevention of bleeding, odors of a printed matter and cost reduction of an irradiation unit.

As the oligomer which can be used jointly with the monoacrylate, an epoxy acrylate oligomer and a urethane acrylate oligomer are especially preferable.

The methacrylate has lower skin irritation than the acrylate.

Among the foregoing compounds, the case where an alkoxy acrylate is used in an amount of less than 70% by mass, with the remaining being an acrylate is preferable because good sensitivity, bleeding characteristic and odor characteristic are brought.

Though the ink composition of the present invention contains the foregoing (i) to (iii) components as essential components, known other components can be used jointly as additives of the ink composition depending upon the purpose. These arbitrary components are hereunder described.

<Coloring Agent>

In the case where the ink composition of the present invention is applied for utilities such as the formation of an image part of a lithographic printing plate, it is not essential to form a colored image. In such a utility of the ink, a coloring agent is not specifically required. For the purpose of enhancing the visibility of an image part formed by an ink composition, or when it is intended to form a colored image by using an ink composition, the ink composition can contain a coloring agent.

Though the coloring agent which can be used in the present invention is not particularly limited, (1) a pigment and (2) an oil-soluble dye, each of which is excellent in weatherability and rich in color reproducibility, are preferable and can be selected and used among arbitrary known coloring agents such as soluble dyes. From the viewpoint of reducing the sensitivity of the curing reaction due to active radiation rays, it is preferable that a compound which does not function as a polymerization inhibitor in a polymerization reaction which is the curing reaction is selected as the coloring agent which can be suitably used in the ink composition or inkjet recording ink composition of the present invention.

(1) Pigment:

The pigment which can be used in the present invention is not particularly limited, and examples thereof include organic or inorganic pigments with the following numbers as described in the color index.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226 and 257; Pigment Violet 3, 19, 23, 29, 30, 37, 50 and 88; and Pigment Orange 13, 16, 20 and 36.

Examples of blue or cyan pigments include Pigment Blue 1, 15, 15:1, 15:2, 15:3, 15:4, 15:6, 16, 17-1, 22, 27, 28, 29, 36 and 60.

Examples of green pigments include Pigment Green 7, 26, 36 and 50.

Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185 and 193.

Examples of black pigments include Pigment Black 7, 28 and 26.

Examples of white pigments include Pigment White 6, 18 and 21.

These pigments are properly selected and used depending upon the purpose.

(2) Oil-Soluble Dye:

The oil-soluble dye which can be used in the present invention is hereunder described.

The oil-soluble dye which can be used in the present invention means a dye which is substantially insoluble in water. Concretely, the oil-soluble dye refers to a dye having a solubility in water (mass of the dye which can be dissolved in 100 g of water) at 25° C. of not more than 1 g, preferably not more than 0.5 g, and more preferably not more than 0.1 g. Accordingly, the oil-soluble dye as referred to in the present invention means a so-called water-insoluble pigment or oil-soluble coloring matter. Of these, an oil-soluble coloring matter is preferable.

Among the oil-soluble dyes which can be used in the present invention, arbitrary yellow dyes can be used. Examples thereof include aryl or heteryl azo dyes having, for example, phenols, naphthols, anilines, pyrazolones, pyridones or open-chain active methylene compounds as a coupling component; azomethine dyes having, for example, open-chain active methylene compounds as a coupling component; methine dyes, for example, benzylidene dyes and monomethine oxonol dyes; and quinone dyes, for example, naphthoquinone dyes and anthraquinone dyes. Examples of other dye species include quinophthalone dyes, nitro-nitroso dyes, acridine dyes and acridinone dyes.

Among the oil-soluble dyes which can be used in the present invention, arbitrary magenta dyes can be used. Examples thereof include aryl or heteryl azo dyes having, for example, phenols, naphthols or anilines as a coupling component; azomethine dyes having, for example, pyrazolones or pyrazolotriazoles as a coupling component; methine dyes, for example, arylidene dyes, styryl dyes, merocyanine dyes and oxonol dyes; carbonium dyes, for example, diphenylmethane dyes, triphenylmethane dyes and xanthene dyes; quinone based dyes, for example, naphthoqinone, anthraquinone and anthrapyridone; and fused polycyclic dyes, for example, dioxazine dyes.

Among the oil-soluble dyes which can be applied in the present invention, arbitrary cyan dyes can be used. Examples thereof include indoaniline dyes, indophenol dyes or azomethine dyes having, for example, pyrrolotriazole dyes as a coupling component; polymethine dyes, for example, cyanine dyes, oxonol dyes and merocyanine dyes; carbonium dyes, for example, diphenylmethane dyes, triphenylmethane dyes and xanthene dyes; phthalocyanine dyes; anthraquinone dyes; aryl or heteryl azo dyes having, for example, phenols, naphthols or anilines as a coupling component; and indigo-thioindigo dyes.

Each of the foregoing dyes may be one which shows a color (for example, yellow, magenta and cyan color) first when a part of its chromophore (color developable atomic group) is dissociated. In that case, a counter cation thereof may be either an inorganic cation such as an alkali metal and ammonium or an organic cation such as pyridinium and a quaternary ammonium salt. It may also be a polymer cation having the same in a structure thereof.

Specific examples of the preferred oil-soluble dye are given below, but it should not be construed that the present invention is limited thereto.

C.I. Solvent Black 3, 7, 27, 29 and 34;
C.I. Solvent Yellow 14, 16, 19, 29, 30, 56, 82, 93 and 162;
C.I. Solvent Red 1, 3, 8, 18, 24, 27, 43, 49, 51, 72, 73, 109, 122, 132 and 218;
C.I. Solvent Violet 3;
C.I. Solvent Blue 2, 11, 25, 35, 38, 67 and 70;
C.I. Solvent Green 3 and 7; and
C.I. Solvent Orange 2.

Among them, for example, Nubian Black PC-0850, Oil Black HBB, Oil Yellow 129, Oil Yellow 105, Oil Pink 312, Oil Red 5B, Oil Scarlet 308, Vali Fast Blue 2606 and Oil Blue BOS (all of which are manufactured by Orient Chemical Industries, Ltd.); Aizen Spilon Blue GNH (manufactured by Hodogaya Chemical Co., Ltd.); and Neopen Yellow 075, Neopen Mazenta SE1378, Neopen Blue 808, Neopen Blue FF4012 and Neopen Cyan FF4238 (all of which are manufactured by BASF AG) are especially preferable.

In the present invention, the oil-soluble dye may be used singly or in admixture of several kinds thereof.

Also, when the oil-soluble dye is used as the coloring agent, for example, other water-soluble dyes, disperse dyes and pigments can be used jointly as the need arises so far as the effects of the present invention are not impaired.

(3) Disperse Dye:

Also, in the present invention, a disperse dye can be used within the range where it is soluble in a water-immiscible organic solvent. In general, though the disperse dye includes a water-soluble dye, in the present invention, it is preferable that the disperse dye is used within the range where it is soluble in a water-immiscible organic solvent.

Specific examples of the preferred disperse dye are given below.

C.I. Disperse Yellow 5, 42, 54, 64, 79, 82, 83, 93, 99, 100, 119, 122, 124, 126, 160, 184:1, 186, 198, 199, 201, 204, 224 and 237;
C.I. Disperse Orange 13, 29, 31:1, 33, 49, 54, 55, 66, 73, 118, 119 and 163;
C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362;
C.I. Disperse Violet 33;
C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and
C.I. Disperse Green 6:1 and 9.

It is preferable that the coloring agent which can be used in the present invention is added in the ink composition or inkjet recording ink composition of the present invention and then appropriately dispersed in the subject ink. For dispersing the coloring agent, various dispersing devices, for example, a ball mill, a sand mill, an attritor, a roll mill, an agitator, a Henschel mixer, a colloid mill, an ultrasonic homogenizer, a pearl mill, a wet type jet mill and a paint shaker.

It is also possible to add a dispersant during dispersing the coloring agent. Though the kind of the dispersant is not particularly limited, it is preferred to use a high-molecular weight dispersant. Examples of the high-molecular weight dispersant include Zeneca's SOLSPERSE Series. It is also possible to use a synergist as a dispersing agent depending on the pigment of every kind. In the present invention, these dispersant and dispersing agent are preferably added in an amount of from 1 to 50 parts by mass based on 100 parts by mass of the coloring agent.

The coloring agent may be blended through direction addition together with the respective components during the preparation of the ink composition of the present invention. For the purpose of enhancing the dispersibility, the coloring agent can also be previously added in a solvent, a specified monofunctional (meth)acrylic acid derivative in the present invention or a dispersion medium such as other polymerizable compounds, which is used jointly if desired, and then can be uniformly dispersed or dissolved the mixture to be blended thereto.

In the present invention, for the purpose of avoiding a reduction with time of solvent resistance of the image part, which is feared when the solvent remains in the cured image, and a problem of VOC (volatile organic compound) of the residual solvent, it is preferable that the coloring agent is blended after adding in any one of polymerizable compounds including the specified monofunctional (meth)acrylic acid derivative or a mixture thereof in advance. Taking into consideration only the viewpoint of dispersion suitability, it is preferred to select a monomer having the lowest viscosity as the polymerizable compound to be used for the addition of the coloring agent.

The coloring agent may be properly selected and used singly or in combination of two or more thereof depending upon the use purpose of the ink composition.

In the ink composition of the present invention, when the coloring agent such as a pigment which exists in a state of solid as it is, it is suitable to select the coloring agent, dispersant and dispersion medium and to set up the dispersing condition and filtering condition such that an average particle size of the coloring agent particle is preferably from 0.005 µm to 0.5 µm, more preferably from 0.01 µm to 0.45 µm, and further preferably from 0.015 µm to 0.4 µm. This particle size control is preferable because clogging of a nozzle can be suppressed, and the storage stability of the ink and the ink transparency and curing sensitivity can be maintained.

The content of the coloring agent in the ink composition of the present invention is properly selected depending upon the use purpose. Taking into consideration of the ink physical properties and coloring properties, in general, the content of the coloring agent is preferably from 1 to 10% by mass, and more preferably from 2 to 8% by mass relative to the mass of the whole of the ink composition.

<Other Components>

Other components can be added in the ink composition of the present invention as the need arises. Examples of other components include a polymerization inhibitor and a solvent.

The polymerization inhibitor can be added from the viewpoint of enhancing the storage stability. When the ink composition of the present invention is used as an inkjet recording ink composition, it is preferable that the ink composition is made low in viscosity by heating at a temperature ranging from 40 to 80° C. and then discharged; and for the purpose of preventing from head clogging to be caused due to the thermal polymerization, it is preferred to add the polymerization inhibitor.

The polymerization inhibitor is preferably added in an amount of from 200 to 20,000 ppm relative to the whole amount of the ink composition of the present invention. Examples of the polymerization inhibitor include hydroquinone, benzoquinone, p-methoxyphenol, TEMPO, TEMPOL and cupferron Al.

In view of the matter that the ink composition or inkjet recording ink composition of the present invention is a radiation curable ink composition, it is preferable that the ink composition does not contain a solvent such that it is able to rapidly react and cure immediately after impacting. But, the ink composition can contain a prescribed solvent so far as the curing rate of the ink composition or the like is not adversely affected. In the present invention, an organic solvent or water can be used as the solvent. In particular, the organic solvent can be added for the purpose of improving the adhesion to a medium to be recorded (for example, a support such as paper). The addition of the organic solvent is effective because the problem of VOC can be avoided.

The amount of the organic solvent is, for example, in the range of from 0.1 to 5% by mass, and preferably from 0.1 to 3% by mass relative to the mass of the whole of the ink composition of the present invention.

Besides, a known compound can be added in the ink composition of the present invention as the need arises. For example, a surfactant; a leveling additive; a matting agent; a polyester based resin, a polyurethane based resin, a vinyl based resin, an acrylic resin, a rubber based resin and a wax for adjusting the film physical properties; and the like can be properly selected and added. Also, for the purpose of improving the adhesion to a medium to be recorded, for example, polyolefins and PET, a tackifier which does not impair the polymerization can be contained. Specific examples thereof include high-molecular weight adhesive polymers as described on pages 5 to 6 of JP-A No. 2001-49200 (for example, copolymers composed of an ester of (meth)acrylic acid and an alcohol containing an alkyl group having from 1 to 20 carbon atoms, an ester of (meth)acrylic acid and an alicyclic alcohol having from 3 to 14 carbon atoms or an ester of (meth)acrylic acid and an aromatic alcohol having from 6 to 14 carbon atoms); and polymerizable unsaturated bond-containing low-molecular weight tackiness imparting resins.

<Inkjet Recording Apparatus>

The inkjet recording apparatus which is used for the recording method of the present invention is not particularly limited, and a known inkjet recording apparatus capable of achieving a target resolution can be arbitrarily selected and used. That is, all of known inkjet recording apparatus including commercial products are able to perform the ink discharge onto the medium to be recorded in the process (a) of the inkjet recording method of the present invention.

Examples of the inkjet recording apparatus which can be used in the present invention include an apparatus including an ink feed system, a temperature sensor and an active radiation ray source.

The ink feed system is composed of, for example, a source tank containing the ink composition of the present invention, a feed pipe, an ink feed tank just before an inkjet head, a filter and a piezo-type inkjet head. The piezo-type inkjet head can be driven such that a multi-size dot of from 1 to 100 pl, and preferably from 8 to 30 pl can be discharged with a resolution of from 320×320 to 4,000×4,000 dpi, preferably from 400× 400 to 1,600×1,600 dpi, and more preferably 720×720 dpi. The term "dpi" as referred to in the present invention expresses a dot number per 2.54 cm.

As described previously, in the radiation curable ink, since the ink to be discharged is desired to be kept at a constant temperature, it is possible to perform thermal insulation and heating from the ink feed tank to the inkjet head portion. A method for controlling the temperature is not particularly limited. For example, a method in which plural temperature sensors are provided in the respective pipe sites and the heating is controlled corresponding to the ink flow rate and the circumferential temperature is preferable. The temperature sensor can be provided in the ink feed tank and in the vicinity of a nozzle of the inkjet head. It is preferable that the head unit to be heated is thermally blocked or insulated such that the apparatus main body is not influenced by the temperature of the outside air. For the purpose of shortening the rise-up time of a printer required for heating or reducing a loss of thermal energy, it is preferable that not only the thermal insulation from other sites is performed, but the thermal capacity of the whole of the heating unit is made small.

Next, the process (b) for irradiating the discharged ink composition with active radiation rays to cure the ink composition is described.

The ink composition having been discharged on a medium to be recorded is cured upon irradiation with active radiation rays. This is because the polymerization initiator contained in the ink composition of the present invention is decomposed upon irradiation with active radiation rays to generate an initiation species such as a radical, an acid and a base; and a polymerization reaction of the specified monofunctional (meth)acrylic acid derivative or other polymerizable compound to be used jointly if desired is caused and promoted, whereby the ink composition is cured. At that time, when the sensitizing dye exists together with the polymerization initiator in the ink composition, the sensitizing dye in the system absorbs active radiation rays to become in an excited state and then comes into contact with the polymerization initiator to promote the decomposition of the polymerization initiator, thereby achieving a curing reaction with higher sensitivity.

Examples the active radiation rays which can be used herein include α-rays, γ-rays, X-rays, electron beams, ultraviolet rays, visible light and infrared rays. Though a peak wavelength of the active radial rays varies with the absorption characteristic of the sensitizing dye, for example, it is preferably from 200 to 600 nm, more preferably from 300 to 450 nm, and further preferably from 350 to 420 nm.

Also, in the present invention, the polymerization initiation system has sufficient sensitivity even to active radiation rays with a low output. Accordingly, the output of the active radiation rays is preferably not more than 2,000 mJ/cm$^2$, more preferably from 10 to 2,000 mJ/cm$^2$, further preferably from 20 to 1,000 mJ/cm$^2$, and especially preferably from 50 to 800 mJ/cm$^2$.

Also, it is suitable that the active radiation rays are irradiated at an illuminance on an exposed surface of, for example, from 10 to 2,000 mW/cm$^2$, and preferably from 20 to 1,000 mW/cm$^2$.

As an active radical ray source, a mercury vapor lamp, a gas or solid laser and the like can be utilized. As a light source which is used for curing of an ultraviolet ray curable inkjet recording ink, a mercury vapor lamp and a metal halide lamp are widely known. However, at present, from the viewpoint of environmental protection, it is eagerly desired that mercury is not used. Replacement with a GaN based semiconductor ultraviolet light-emitting device is very useful industrially and environmentally. Furthermore, LED (UV-LED) and LD (UV-LD) are small in size, high in life span, high in efficiency and low in cost and are expected as a photocurable inkjet light source.

Also, it is possible to use a light-emitting diode (LED) and a laser diode (LD) as the active radial ray source. In particular, when an ultraviolet ray source is required, an ultraviolet LED and an ultraviolet LD can be used. For example, Nichia Corporation places an ultraviolet LED, whose main emission spectrum has a wavelength ranging from 365 nm to 420 nm, on the market. In the case where a much shorter wavelength is required, U.S. Pat. No. 6,084,250 discloses an LED capable of emitting active radiation rays, which is centered in the range of from 300 nm to 370 nm. Also, other ultraviolet LED is available and is able to irradiate radiations of a different ultraviolet ray band. In the present invention, an UV-LED is especially preferable as the active radiation ray source. An UV-LED having a peak wavelength of from 350 nm to 420 nm is especially preferable.

Also, the maximum illuminance of LED on a medium to be recorded is preferably from 10 to 2,000 mW/cm$^2$, more preferably from 20 to 1,000 mW/cm$^2$, and especially preferably from 50 to 800 mW/cm$^2$.

It is suitable that the ink composition of the present invention is irradiated with such active radiation rays for, for example, from 0.01 to 120 seconds, and preferably from 0.1 to 90 seconds.

Irradiation condition and basic irradiation method of active radiation rays are disclosed in JP-A No. 60-132767. Concretely, the irradiation is carried out by providing a light source on both sides of a head unit including an ink discharge device and scanning the head unit and the light source in a so-called shuttle mode. The irradiation of active radiation rays is carried out by leaving a fixed time (for example, from 0.01 to 0.5 seconds, preferably from 0.01 to 0.3 seconds, and more preferably from 0.01 to 0.15 seconds) after impacting of the ink. In this way, by controlling the time of from impacting of the ink to irradiation at an extremely short time, it becomes possible to prevent bleeding of the ink having been impacted onto the medium to be recorded prior to curing. Also, when even a porous medium to be recorded is used, the ink can be exposed before the ink penetrates to a deep part where the light source does not reach, therefore, the retention of the unreacted monomer can be suppressed, resulting in reducing an odor.

Furthermore, the curing may be accomplished by a separate light source which is not accompanied with driving. WO 99/54415 discloses, as an irradiation method, a method of using optical fibers and a method of exposing a collimated light source to a mirror surface provided on the surface of the head unit side and irradiating a recording part with UV rays. Such a curing method is also applicable to the recording method of the present invention.

By employing the foregoing inkjet recording method, a dot size of the impacted ink can be kept constant even for various media to be recorded having different surface wettability, thereby enhancing the image quality. In order to obtain a color image, it is preferred to superimpose colors successively in the order from a color with low brightness. By superposing inks successively in the order from an ink with low brightness, irradiated rays are liable to reach even an ink of the lower part, whereby good curing sensitivity, reduction of the residual monomer, reduction of an odor and enhancement of adhesion can be expected. Also, with respect to the irradiation, though the exposure can be collectively performed by discharging all colors, from the viewpoint of promoting the curing, it is preferable that the exposure is performed for every color.

In this way, the ink composition of the present invention is cured with high sensitivity upon irradiation with active radiation rays, thereby forming a hydrophobic image on a surface of a medium to be recorded.

Here, the active radiation ray source to be used for curing the ink or its preferred irradiation condition is also the same as that mentioned in the inkjet recording method.

The ink composition of the present invention is cured with high sensitivity upon irradiation with active radiation rays, thereby enabling one to form a hydrophobic region which is excellent in adhesion to the support and film quality. For that reason, in addition to the formation of a colored image or marking or the like, for example, the ink composition of the present invention can also be used for the formation of an image part of a lithographic printing plate. By applying the ink composition of the present invention to this utility, it is also possible to obtain a lithographic printing plate having high image quality and excellent printing resistance.

Needless to say, for the foregoing reasons, while the ink composition of the present invention is excellent for inkjet recording, it is also useful as a generally used ink composition.

EXAMPLES

The present invention is more specifically described with the examples below which are not intended to limit the scope of the invention.

Example 1

The components below were mixed using a high-speed water cooling type stirring machine to obtain a white UV ink composition for UV inkjet recording.

| White Ink Composition 1 | |
|---|---|
| Light Acrylate L-A (lauryl acrylate: a monofunctional acrylate (the component (iii))) | 15.4 parts |
| Actilane 421 (an acrylate monomer manufactured by Akcros) (propoxylated neopentyl glycol diacrylate: a bifunctional acrylate (the component (iii))) | 22.0 parts |
| Photomer 2017 (a UV diluent manufactured by EChem) | 15.0 parts |
| Solsperse 36000 (a dispersing agent manufactured by Noveon) | 2.0 parts |
| MICROLITH WHITE R-A (a pigment manufactured by Ciba Specialty Chemicals Inc.: the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (I-1) having the structure shown below) | 10.0 parts |
| Darocur TPO (In Tables 1 and 2 below, expressed as TPO) (a photopolymerization initiator (the component (ii)) manufactured by Ciba Specialty Chemicals Inc.) | 8.5 parts |
| Irgacure 907 (In Tables 1 and 2 below, expresses as 907) (a photopolymerization initiator (the component (ii)) manufactured by Ciba Specialty Chemicals Inc.) | 4.0 parts |
| Byk 307 (an anti-foaming agent manufactured by BYK Chemie) | 0.05 parts |

(I-1)

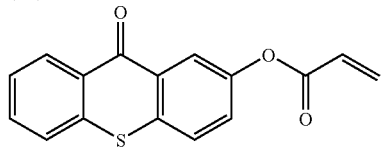

<Evaluation of Ink>

Droplets of the resulting ink composition were deposited on a polyvinyl chloride sheet and cured by passing the sheet at a specific rate under light from an ultraviolet light-emitting diode (UV-LED) for exposure so that a print was obtained.

In the example, the ink was ejected from a commercially available inkjet recording system equipped with a piezoelectric inkjet nozzle, and the light-emitting diode (UV-LED) used for curing was NCCU033 manufactured by Nichia Corporation. The LED emits ultraviolet light with a wavelength of 365 nm from a single chip and emits about 100 mW light from the chip upon application of a current of about 500 mA. A plurality of the LEDs were arranged at intervals of 7 mm such that a power of 0.3 W/cm² was obtained on the surface of the recording medium to be recorded (hereinafter also referred to as the medium). The time after the deposition of the droplets until the exposure and the exposure time are changeable by controlling the feed speed of the medium and the distance between the head and the LED in the feed direction. In the example, the exposure to light was performed about 0.5 seconds after the deposition.

The exposure energy on the medium is adjustable between 0.01 J/cm² and 15 J/cm² depending on the setting of the distance from the medium and the feed speed.

Under the conditions described above, evaluations were performed as described below.

Evaluation Items

Curing Sensitivity

The value of an exposure energy at which the stickiness of the printed surface became undetectable was defined as the curing sensitivity.

Immediately after the printing, the printed surface was pressed against a sheet of standard paper (copy paper C2 manufactured by Fuji Xerox Co., Ltd.). When color migration occurred, the printed surface was determined as having stickiness. When color migration did not occur, the printed surface was determined as not having stickiness. The lower the value, the higher the sensitivity. The curing sensitivity was evaluated according to the following criteria.

A: surface stickiness is undetectable at an exposure energy of 300 mJ/cm²;

B: surface stickiness is undetectable at an exposure energy of 600 mJ/cm²;

C: an exposure energy of more than 900 mJ/cm² is needed to eliminate the surface stickiness.

Anti-Blocking Property

A sheet of paper of the same quality as the paper used for printing was placed on the cured image, and a load of about 50 g/cm² was applied thereto and left to stand at 50° C. for 24 hours. The degree of the transfer of the image portion to the sheet of paper placed thereon was visually observed and evaluated according to the following criteria:

A: transfer does not occur;

B: transfer slightly occurs;

C: transfer occurs.

Discharge Stability

After storing the obtained white ink composition at room temperature for two weeks, recording was carried out on a medium to be recorded by using a commercially available inkjet recording apparatus having piezo-type inkjet nozzles, and continuous printing was carried out at room temperature for 48 hours. The presence or absence of dot deletion and spattering of the ink was visually observed and evaluated according to the following criteria. The obtained results are shown in Table 1.

A: Dot deletion or spattering of the ink did not occur or occurred not more than 3 times.

B: Dot deletion or spattering of the ink occurred 4 times to 10 times.

C: Dot deletion or spattering of the ink occurred 11 times or more.

At that time, the formed image developed a good white color.

The ink feed system of the inkjet recording apparatus used for the evaluation is composed of a source tank, a feed pipe, an ink feed tank just before an inkjet head, a filter and a piezo-type inkjet head.

Thermal insulation and heating were carried out from the ink feed tank to the inkjet head. Temperature sensors were provided in the ink feed tank and in the vicinity of the nozzle of the inkjet head, respectively, and the temperature was controlled such that the temperature of the nozzle portion was always 70° C.±2° C.

The piezo-type inkjet head was driven such that multi-size dots of from 8 to 30 pl could be discharged with a resolution of 720×720 dpi. The term "dpi" as referred to in the present invention expresses a dot number per 2.54 cm.

Example 2

The components below were mixed using a high-speed water cooling type stirring machine to obtain a white UV ink composition for UV inkjet recording.

| White Ink Composition 2 | |
| --- | --- |
| Light Acrylate L-A (lauryl acrylate: a monofunctional acrylate (the component (iii))) | 15.4 parts |
| Actilane 421 (an acrylate monomer manufactured by Akcros) (propoxylated neopentyl glycol diacrylate: a bifunctional acrylate (the component (iii))) | 22.0 parts |
| Photomer 2017 (a UV diluent manufactured by EChem) | 15.0 parts |
| Solsperse 36000 (a dispersing agent manufactured by Noveon) | 2.0 parts |
| MICROLITH WHITE R-A (a pigment manufactured by Ciba Specialty Chemicals Inc.: the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (II-38) having the structure shown below) | 10.0 parts |
| Darocur TPO (a photopolymerization initiator (the component (ii)) manufactured by Ciba Specialty Chemicals Inc.) | 8.5 parts |
| Irgacure 907 (a photopolymerization initiator (the component (ii)) manufactured by Ciba Specialty Chemicals Inc.) | 4.0 parts |
| Byk 307 (an anti-foaming agent manufactured by BYK Chemie) | 0.05 parts |

(II-38)

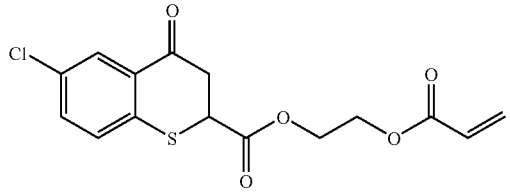

<Evaluation of Ink>

The prepared white ink composition was deposited on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 3

The components below were mixed using a high-speed water cooling type stirring machine to obtain a white UV ink composition for UV inkjet recording.

| White Ink Composition 3 | |
|---|---|
| Light Acrylate L-A | 15.4 parts |
| (lauryl acrylate: a monofunctional acrylate (the component (iii))) | |
| Actilane 421 (an acrylate monomer manufactured by Akcros) | 22.0 parts |
| (propoxylated neopentyl glycol diacrylate: a bifunctional acrylate (the component (iii))) | |
| Photomer 2017 (a UV diluent manufactured by EChem) | 15.0 parts |
| Solsperse 36000 (a dispersing agent manufactured by Noveon) | 2.0 parts |
| MICROLITH WHITE R-A | 15.0 parts |
| (a pigment manufactured by Ciba Specialty Chemicals Inc.: the component (iv)) | |
| Genorad 16 (a stabilizer manufactured by Rahn) | 0.05 parts |
| Rapi-Cure DVE-3 | 8.0 parts |
| (vinyl ether (the component (iii)) manufactured by ISP Europe) | |
| Specific sensitizing dye (the component (i)) | 10.0 parts |
| (Compound (II-4) having the structure shown below) | |
| Darocur TPO | 8.5 parts |
| (a photopolymerization initiator (the component (ii)) manufactured by Ciba Specialty Chemicals Inc.) | |
| Irgacure 907 | 4.0 parts |
| (a photopolymerization initiator (the component (ii)) manufactured by Ciba Specialty Chemicals Inc.) | |
| Byk 307 (an anti-foaming agent manufactured by BYK Chemie) | 0.05 parts |

(II-4)

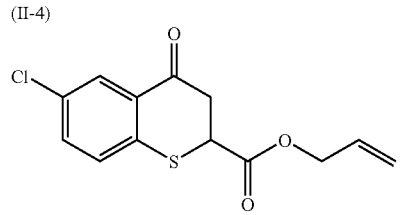

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 4

The components below were mixed using a high-speed water cooling type stirring machine to obtain a white UV ink composition for UV inkjet recording.

| White Ink Composition 4 | |
|---|---|
| Light Acrylate L-A | 15.4 parts |
| (lauryl acrylate: a monofunctional acrylate (the component (iii))) | |
| Actilane 421 (an acrylate monomer manufactured by Akcros) | 22.0 parts |
| (propoxylated neopentyl glycol diacrylate: a bifunctional acrylate (the component (iii))) | |
| Photomer 2017 (a UV diluent manufactured by EChem) | 15.0 parts |
| Solsperse 36000 (a dispersing agent manufactured by Noveon) | 2.0 parts |
| MICROLITH WHITE R-A | 15.0 parts |
| (a pigment manufactured by Ciba Specialty Chemicals Inc.: the component (iv)) | |
| Genorad 16 (a stabilizer manufactured by Rahn) | 0.05 parts |
| Rapi-Cure DVE-3 | 8.0 parts |
| (vinyl ether (the component (iii)) manufactured by ISP Europe) | |
| Specific sensitizing dye (the component (i)) | 10.0 parts |
| (Compound (II-9) having the structure shown below) | |
| Darocur TPO (In Tables 1 and 2 below, expressed as TPO) | 8.5 parts |
| (a photopolymerization initiator (the component (ii)) manufactured by Ciba Specialty Chemicals Inc.) | |
| Irgacure 907 | 4.0 parts |
| (a photopolymerization initiator (the component (ii)) manufactured by Ciba Specialty Chemicals Inc.) | |
| Byk 307 (an anti-foaming agent manufactured by BYK Chemie) | 0.05 parts |

(II-9)

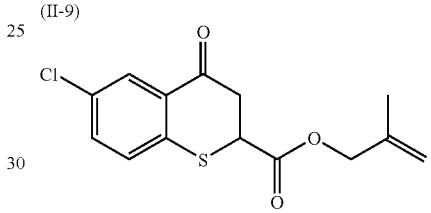

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 5

The components below were mixed using a high-speed water cooling type stirring machine to obtain a white UV ink composition for UV inkjet recording.

| White Ink Composition 5 | |
|---|---|
| Light Acrylate L-A | 15.4 parts |
| (lauryl acrylate: a monofunctional acrylate (the component (iii))) | |
| Actilane 421 (an acrylate monomer manufactured by Akcros) | 22.0 parts |
| (propoxylated neopentyl glycol diacrylate: a bifunctional acrylate (the component (iii))) | |
| Photomer 2017 (a UV diluent manufactured by EChem) | 15.0 parts |
| Solsperse 36000 (a dispersing agent manufactured by Noveon) | 2.0 parts |
| MICROLITH WHITE R-A | 15.0 parts |
| (a pigment manufactured by Ciba Specialty Chemicals Inc.: the component (iv)) | |
| Genorad 16 (a stabilizer manufactured by Rahn) | 0.05 parts |
| Rapi-Cure DVE-3 | 8.0 parts |
| (vinyl ether (the component (iii)) manufactured by ISP Europe) | |

53
-continued

| White Ink Composition 5 | |
|---|---|
| Specific sensitizing dye (the component (i)) | 10.0 parts |
| (Compound (II-48) having the structure shown below) | |
| Darocur TPO (In Tables 1 and 2 below, expressed as TPO) | 8.5 parts |
| (a photopolymerization initiator (the component (ii)) | |
| manufactured by Ciba Specialty Chemicals Inc.) | |
| Irgacure 907 | 4.0 parts |
| (a photopolymerization initiator (the component (ii)) | |
| manufactured by Ciba Specialty Chemicals Inc.) | |
| Byk 307 (an anti-foaming agent manufactured | 0.05 parts |
| by BYK Chemie) | |

(II-48)

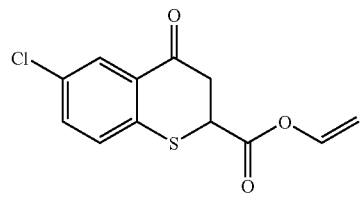

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 6

The components below were mixed using a high-speed water cooling type stirring machine to obtain a white UV ink composition for UV inkjet recording.

| White Ink Composition 6 | |
|---|---|
| Light Acrylate L-A | 15.4 parts |
| (lauryl acrylate: a monofunctional acrylate | |
| (the component (iii))) | |
| Actilane 421 (an acrylate monomer manufactured | 22.0 parts |
| by Akcros) | |
| (propoxylated neopentyl glycol diacrylate: | |
| a bifunctional acrylate (the component (iii))) | |
| Photomer 2017 (a UV diluent manufactured by EChem) | 15.0 parts |
| Solsperse 36000 (a dispersing agent manufactured | 2.0 parts |
| by Noveon) | |
| MICROLITH WHITE R-A | 15.0 parts |
| (a pigment manufactured by Ciba Specialty Chemicals Inc.: | |
| the component (iv)) | |
| Genorad 16 (a stabilizer manufactured by Rahn) | 0.05 parts |
| Rapi-Cure DVE-3 | 8.0 parts |
| (vinyl ether (the component (iii)) manufactured by | |
| ISP Europe) | |
| Specific sensitizing dye (the component (i)) | 10.0 parts |
| (Compound (II-58) having the structure shown below) | |
| Darocur TPO (In Tables 1 and 2 below, expressed as TPO) | 8.5 parts |
| (a photopolymerization initiator (the component (ii)) | |
| manufactured by Ciba Specialty Chemicals Inc.) | |

54
-continued

| White Ink Composition 6 | |
|---|---|
| Irgacure 907 | 4.0 parts |
| (a photopolymerization initiator (the component (ii)) | |
| manufactured by Ciba Specialty Chemicals Inc.) | |
| Byk 307 (an anti-foaming agent manufactured | 0.05 parts |
| by BYK Chemie) | |

(II-58)

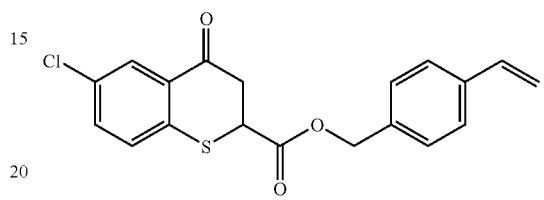

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 7

The components below were mixed using a high-speed water cooling type stirring machine to obtain a white UV ink composition for UV inkjet recording.

| White Ink Composition 7 | |
|---|---|
| Light Acrylate L-A | 15.4 parts |
| (lauryl acrylate: a monofunctional acrylate | |
| (the component (iii))) | |
| Actilane 421 (an acrylate monomer manufactured | 22.0 parts |
| by Akcros) | |
| (propoxylated neopentyl glycol diacrylate: | |
| a bifunctional acrylate (the component (iii))) | |
| Photomer 2017 (a UV diluent manufactured by EChem) | 15.0 parts |
| Solsperse 36000 (a dispersing agent manufactured | 2.0 parts |
| by Noveon) | |
| MICROLITH WHITE R-A | 15.0 parts |
| (a pigment manufactured by Ciba Specialty Chemicals Inc.: | |
| the component (iv)) | |
| Genorad 16 (a stabilizer manufactured by Rahn) | 0.05 parts |
| Rapi-Cure DVE-3 | 8.0 parts |
| (vinyl ether (the component (iii)) manufactured by | |
| ISP Europe) | |
| Specific sensitizing dye (the component (i)) | 10.0 parts |
| (Compound (II-58) having the structure shown below) | |
| Darocur TPO (In Tables 1 and 2 below, expressed as TPO) | 8.5 parts |
| (a photopolymerization initiator (the component (ii)) | |
| manufactured by Ciba Specialty Chemicals Inc.) | |

White Ink Composition 7

| | |
|---|---|
| Irgacure 907 (a photopolymerization initiator (the component (ii)) manufactured by Ciba Specialty Chemicals Inc.) | 4.0 parts |
| Byk 307 (an anti-foaming agent manufactured by BYK Chemie) | 0.05 parts |

(II-58)

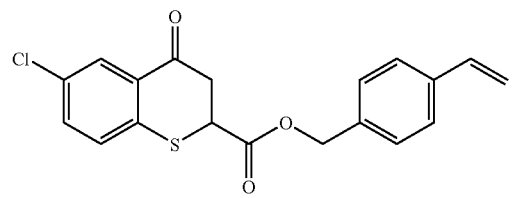

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 8

The components below were mixed using a high-speed water cooling type stirring machine to obtain a white UV ink composition for UV inkjet recording.

White Ink Composition 8

| | |
|---|---|
| Light Acrylate L-A (lauryl acrylate: a monofunctional acrylate (the component (iii))) | 15.4 parts |
| Actilane 421 (an acrylate monomer manufactured by Akcros) (propoxylated neopentyl glycol diacrylate: a bifunctional acrylate (the component (iii))) | 22.0 parts |
| Photomer 2017 (a UV diluent manufactured by EChem) | 15.0 parts |
| Solsperse 36000 (a dispersing agent manufactured by Noveon) | 2.0 parts |
| MICROLITH WHITE R-A (a pigment manufactured by Ciba Specialty Chemicals Inc.: the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (II-67) having the structure shown below) | 10.0 parts |
| Darocur TPO (a photopolymerization initiator (the component (ii)) manufactured by Ciba Specialty Chemicals Inc.) | 8.5 parts |

White Ink Composition 8

| | |
|---|---|
| Irgacure 907 (a photopolymerization initiator (the component (ii)) manufactured by Ciba Specialty Chemicals Inc.) | 4.0 parts |
| Byk 307 (an anti-foaming agent manufactured by BYK Chemie) | 0.05 parts |

(II-67)

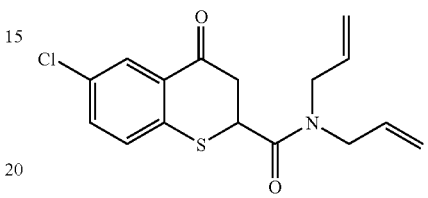

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 9

The components below were mixed using a high-speed water cooling type stirring machine to obtain a white UV ink composition for UV inkjet recording.

White Ink Composition 9

| | |
|---|---|
| Light Acrylate L-A (lauryl acrylate: a monofunctional acrylate (the component (iii))) | 15.4 parts |
| Actilane 421 (an acrylate monomer manufactured by Akcros) (propoxylated neopentyl glycol diacrylate: a bifunctional acrylate (the component (iii))) | 22.0 parts |
| Photomer 2017 (a UV diluent manufactured by EChem) | 15.0 parts |
| Solsperse 36000 (a dispersing agent manufactured by Noveon) | 2.0 parts |
| MICROLITH WHITE R-A (a pigment manufactured by Ciba Specialty Chemicals Inc.: the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (I-18) having the structure shown below) | 10.0 parts |
| Darocur TPO (a photopolymerization initiator (the component (ii)) manufactured by Ciba Specialty Chemicals Inc.) | 8.5 parts |

-continued

White Ink Composition 9

| | |
|---|---|
| Irgacure 907 | 4.0 parts |
| (a photopolymerization initiator (the component (ii)) | |
| manufactured by Ciba Specialty Chemicals Inc.) | |
| Byk 307 (an anti-foaming agent manufactured | 0.05 parts |
| by BYK Chemie) | |

(I-18)

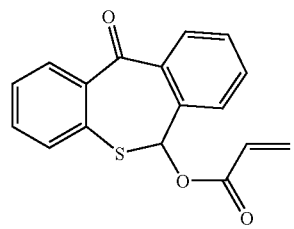

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 10

The components below were mixed using a high-speed water cooling type stirring machine to obtain a white UV ink composition for UV inkjet recording.

White Ink Composition 1

| | |
|---|---|
| Light Acrylate L-A | 15.4 parts |
| (lauryl acrylate: a monofunctional acrylate | |
| (the component (iii))) | |
| Actilane 421 (an acrylate monomer manufactured | 22.0 parts |
| by Akcros) | |
| (propoxylated neopentyl glycol diacrylate: | |
| a bifunctional acrylate (the component (iii))) | |
| Photomer 2017 (a UV diluent manufactured by EChem) | 15.0 parts |
| Solsperse 36000 (a dispersing agent manufactured | 2.0 parts |
| by Noveon) | |
| MICROLITH WHITE R-A | 15.0 parts |
| (a pigment manufactured by Ciba Specialty Chemicals Inc.: | |
| the component (iv)) | |
| Genorad 16 (a stabilizer manufactured by Rahn) | 0.05 parts |
| Rapi-Cure DVE-3 | 8.0 parts |
| (vinyl ether (the component (iii)) manufactured by | |
| ISP Europe) | |
| Specific sensitizing dye (the component (i)) | 10.0 parts |
| (Compound (II-75) having the structure shown below) | |
| Darocur TPO (In Tables 1 and 2 below, expressed as TPO) | 8.5 parts |
| (a photopolymerization initiator (the component (ii)) | |
| manufactured by Ciba Specialty Chemicals Inc.) | |

-continued

White Ink Composition 1

| | |
|---|---|
| Irgacure 907 | 4.0 parts |
| (a photopolymerization initiator (the component (ii)) | |
| manufactured by Ciba Specialty Chemicals Inc.) | |
| Byk 307 (an anti-foaming agent manufactured | 0.05 parts |
| by BYK Chemie) | |

(II-75)

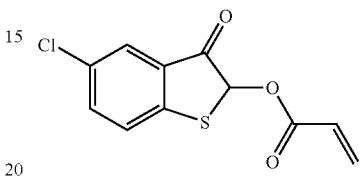

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 11

The components below were mixed using a high-speed water cooling type stirring machine to obtain a white UV ink composition for UV inkjet recording.

White Ink Composition 11

| | |
|---|---|
| Light Acrylate L-A | 15.4 parts |
| (lauryl acrylate: a monofunctional acrylate | |
| (the component (iii))) | |
| Actilane 421 (an acrylate monomer manufactured | 22.0 parts |
| by Akcros) | |
| (propoxylated neopentyl glycol diacrylate: | |
| a bifunctional acrylate (the component (iii))) | |
| Photomer 2017 (a UV diluent manufactured by EChem) | 15.0 parts |
| Solsperse 36000 (a dispersing agent manufactured | 2.0 parts |
| by Noveon) | |
| MICROLITH WHITE R-A | 15.0 parts |
| (a pigment manufactured by Ciba Specialty Chemicals Inc.: | |
| the component (iv)) | |
| Genorad 16 (a stabilizer manufactured by Rahn) | 0.05 parts |
| Rapi-Cure DVE-3 | 8.0 parts |
| (vinyl ether (the component (iii)) manufactured by | |
| ISP Europe) | |
| Specific sensitizing dye (the component (i)) | 6.0 parts |
| (Compound (II-4) having the structure shown below) | |
| Specific sensitizing dye (the component (i)) | 4.0 parts |
| (Compound (II-83) having the structure shown below) | |
| Darocur TPO (In Tables 1 and 2 below, expressed as TPO) | 8.5 parts |
| (a photopolymerization initiator (the component (ii)) | |
| manufactured by Ciba Specialty Chemicals Inc.) | |

White Ink Composition 11

| | |
|---|---|
| Irgacure 907 | 4.0 parts |
| (a photopolymerization initiator (the component (ii)) manufactured by Ciba Specialty Chemicals Inc.) | |
| Byk 307 (an anti-foaming agent manufactured by BYK Chemie) | 0.05 parts |

(II-4)

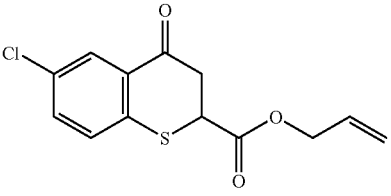

(II-83)

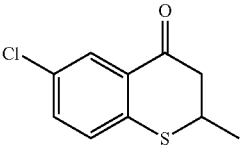

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 12

The components below were mixed using a high-speed water cooling type stirring machine to obtain a white ink composition for UV inkjet recording.

White Ink Composition 12

| | |
|---|---|
| Phenoxyethyl acrylate (the component (iii)) | 21.0 parts |
| N-vinylcaprolactam (the component (iii)) | 14.0 parts |
| FA-512A (with the structure shown below) (the component (iii)) | 17.4 parts |
| Solsperse 36000 (a dispersing agent manufactured by Noveon) | 2.0 parts |
| MICROLITH WHITE R-A (a pigment manufactured by Ciba Specialty Chemicals Inc. (the component (iv))) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (II-4) having the structure shown above) | 10.0 parts |
| Darocur TPO (a photopolymerization initiator (the component (ii)) manufactured by Ciba Specialty Chemicals Inc.) | 8.5 parts |

White Ink Composition 12

| | |
|---|---|
| Irgacure 907 (a photopolymerization initiator (the component (ii)) manufactured by Ciba Specialty Chemicals Inc.) | 4.0 parts |
| Byk 307 (an anti-foaming agent manufactured by BYK Chemie) | 0.05 parts |

(FA-512)

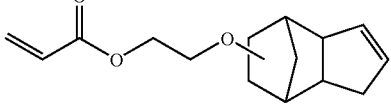

<Evaluation of the Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 13

The components below were mixed using a high-speed water cooling type stirring machine to obtain a white UV ink composition for UV inkjet recording.

White Ink Composition 13

| | |
|---|---|
| Light Acrylate L-A (lauryl acrylate: a monofunctional acrylate (the component (iii))) | 15.4 parts |
| Actilane 421 (an acrylate monomer manufactured by Akcros) (propoxylated neopentyl glycol diacrylate: a bifunctional acrylate (the component (iii))) | 22.0 parts |
| Photomer 2017 (a UV diluent manufactured by EChem) | 15.0 parts |
| Solsperse 36000 (a dispersing agent manufactured by Noveon) | 2.0 parts |
| MICROLITH WHITE R-A (a pigment manufactured by Ciba Specialty Chemicals Inc.: the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (II-4) having the structure shown above) | 10.0 parts |
| Darocur TPO (a photopolymerization initiator (the component (ii)) manufactured by Ciba Specialty Chemicals Inc. | 8.5 parts |
| Irgacure 184 (a photopolymerization initiator (the component (ii)) manufactured by Ciba Specialty Chemicals Inc.) | 2.0 parts |
| Benzophenone (the component (ii), in Tables 1 and 2 below, expresses as benzophenone) | |
| Byk 307 (an anti-foaming agent manufactured by BYK Chemie) | 0.05 parts |

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 14

The components below were mixed using a high-speed water cooling type stirring machine to obtain a white UV ink composition for UV inkjet recording.

| White Ink Composition 14 | |
|---|---|
| Light Acrylate L-A (lauryl acrylate: a monofunctional acrylate (the component (iii))) | 15.4 parts |
| Actilane 421 (an acrylate monomer manufactured by Akcros) (propoxylated neopentyl glycol diacrylate: a bifunctional acrylate (the component (iii))) | 22.0 parts |
| Photomer 2017 (a UV diluent manufactured by EChem) | 15.0 parts |
| Solsperse 36000 (a dispersing agent manufactured by Noveon) | 2.0 parts |
| MICROLITH WHITE R-A (a pigment manufactured by Ciba Specialty Chemicals Inc.: the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (II-4) having the structure shown above) | 10.0 parts |
| Irgacure 2959 (a photopolymerization initiator (the component (ii)) manufactured by Ciba Specialty Chemicals Inc., in Tables 1 and 2 below, expresses as 2959) | 8.5 parts |
| Irgacure 819 (a photopolymerization initiator (the component (ii)) manufactured by Ciba Specialty Chemicals Inc., in Tables 1 and 2 below, expresses as 819) | 4.0 parts |
| Byk 307 (an anti-foaming agent manufactured by BYK Chemie) | 0.05 parts |

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 15

The components below were mixed using a high-speed water cooling type stirring machine to obtain a white UV ink composition for UV inkjet recording.

| White Ink Composition 15 | |
|---|---|
| Light Acrylate L-A (lauryl acrylate: a monofunctional acrylate (the component (iii))) | 15.4 parts |
| Actilane 421 (an acrylate monomer manufactured by Akcros) (propoxylated neopentyl glycol diacrylate: a bifunctional acrylate (the component (iii))) | 22.0 parts |
| Photomer 2017 (a UV diluent manufactured by EChem) | 15.0 parts |
| Solsperse 36000 (a dispersing agent manufactured by Noveon) | 2.0 parts |
| MICROLITH WHITE R-A (a pigment manufactured by Ciba Specialty Chemicals Inc.: the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (II-4) having the structure shown above) | 10.0 parts |
| Darocur TPO (In Tables 1 and 2 below, expressed as TPO) (a photopolymerization initiator (the component (ii)) manufactured by Ciba Specialty Chemicals Inc.) | 8.5 parts |
| Irgacure 2959 (a photopolymerization initiator (the component (ii)) manufactured by Ciba Specialty Chemicals Inc., in Tables 1 and 2 below, expresses as 2959) | 8.5 parts |
| Irgacure 819 (a photopolymerization initiator (the component (ii)) manufactured by Ciba Specialty Chemicals Inc., in Tables 1 and 2 below, expresses as 819) | 4.0 parts |
| Byk 307 (an anti-foaming agent manufactured by BYK Chemie) | 0.05 parts |

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 1 below.

Example 16

The components below were mixed using a high-speed water cooling type stirring machine to obtain a white UV ink composition for UV inkjet recording.

| White Ink Composition 16 | |
|---|---|
| Light Acrylate L-A (lauryl acrylate: a monofunctional acrylate (the component (iii))) | 15.4 parts |
| Actilane 421 (an acrylate monomer manufactured by Akcros) (propoxylated neopentyl glycol diacrylate: a bifunctional acrylate (the component (iii))) | 22.0 parts |
| Photomer 2017 (a UV diluent manufactured by EChem) | 15.0 parts |
| Solsperse 36000 (a dispersing agent manufactured by Noveon) | 2.0 parts |
| MICROLITH WHITE R-A (a pigment manufactured by Ciba Specialty Chemicals Inc.: the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (II-4) having the structure shown above) | 6.0 parts |
| Specific sensitizing dye (the component (i)) (Compound (I-14) having the structure shown below) | 4.0 parts |
| Irgacure OXE 01 (a photopolymerization initiator (the component (ii)) manufactured by Ciba Specialty Chemicals) | 8.5 parts |
| Irgacure 184 (a photopolymerization initiator (the component (ii)) manufactured by Ciba Specialty Chemicals) | 4.0 parts |
| Byk 307 (an anti-foaming agent manufactured by BYK Chemie) Chemicals Inc.) | 0.05 parts |
| Byk 307 (an anti-foaming agent manufactured by BYK Chemie) | 0.05 parts |

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light.

The print produced with the ink was evaluated in a similar manner to that in Example 1. Results are shown in Table 2 below.

Example 17

The components below were mixed using a high-speed water cooling type stirring machine to obtain a cyan ink composition for UV inkjet recording.

| White Ink Composition 17 | |
| --- | --- |
| Light Acrylate L-A<br>(lauryl acrylate: a monofunctional acrylate<br>(the component (iii))) | 15.4 parts |
| Actilane 421 (an acrylate monomer manufactured by Akcros)<br>(propoxylated neopentyl glycol diacrylate: a bifunctional<br>acrylate (the component (iii))) | 22.0 parts |
| Photomer 2017 (a UV diluent manufactured by EChem) | 15.0 parts |
| Solsperse 36000 (a dispersing agent manufactured by Noveon) | 2.0 parts |
| MICROLITH WHITE R-A<br>(a pigment manufactured by Ciba Specialty Chemicals<br>Inc.: the component (iv)) | 15.0 parts |
| Genorad 16 (a stabilizer manufactured by Rahn) | 0.05 parts |
| Rapi-Cure DVE-3<br>(vinyl ether (the component (iii)) manufactured by<br>ISP Europe) | 8.0 parts |
| Specific sensitizing dye (the component (i))<br>(Compound (II-4) having the structure shown above) | 10.0 parts |
| Irgacure 907<br>(a photopolymerization initiator (the component (ii))<br>manufactured by Ciba Specialty Chemicals Inc.) | 8.5 parts |
| Irgacure 819<br>(a photopolymerization initiator (the component (ii))<br>manufactured by Ciba Specialty Chemicals Inc.) | 4.0 parts |
| Byk 307 (an anti-foaming agent manufactured by BYK<br>Chemie) | 0.05 parts |

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 2 below.

Example 18

The components below were mixed using a high-speed water cooling stirring machine to obtain a magenta ink composition for UV inkjet recording.

| Cyan Ink Composition 1 | |
| --- | --- |
| Light Acrylate L-A (the component (iii)) | 19.4 parts |
| Actilane 421 (an acrylate monomer manufactured by Akcros)<br>(propoxylated neopentyl glycol diacrylate: a bifunctional<br>acrylate (the component (iii))) | 28.0 parts |
| Photomer 2017 (a UV diluent manufactured by EChem) | 18.0 parts |
| Solsperse 32000<br>(a dispersing agent manufactured by Noveon) | 0.4 parts |
| Irgalite Blue GLVO<br>(a pigment manufactured by Ciba Specialty Chemical Inc.<br>(the component (iv)) | 3.6 parts |
| Genorad 16 (a stabilizer manufactured by Rahn) | 0.05 parts |
| Rapi-Cure DVE-3<br>(vinyl ether (the component (iii)) manufactured by<br>ISP Europe) | 8.0 parts |
| Specific sensitizing dye (the component (i))<br>(Compound (II-4) having the structure shown above) | 10.0 parts |
| Darocur TPO<br>(a photopolymerization initiator (the component (ii))<br>manufactured by Ciba Specialty Chemicals Inc.) | 8.5 parts |
| Irgacure 907<br>(a photopolymerization initiator (the component (ii))<br>manufactured by Ciba Specialty Chemicals Inc.) | 4.0 parts |
| Byk 307 (an anti-foaming agent manufactured by BYK<br>Chemie) | 0.05 parts |

<Evaluation of Ink>

The prepared cyan ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 2 below.

Example 18

The components below were mixed using a high-speed water cooling stirring machine to obtain a magenta ink composition for UV inkjet recording.

| Magenta Ink Composition 1 | |
| --- | --- |
| Light Acrylate L-A (the component (iii)) | 13.4 parts |
| Actilane 421 (an acrylate monomer manufactured by Akcros)<br>(propoxylated neopentyl glycol diacrylate: a bifunctional<br>acrylate (the component (iii))) | 34.0 parts |
| Photomer 2017 (a UV diluent manufactured by EChem) | 18.0 parts |
| Solsperse 32000<br>(a dispersing agent manufactured by Noveon) | 0.4 parts |
| Cinquasia Mazenta RT-355 D<br>(a pigment manufactured by Ciba Specialty Chemical<br>Inc. (the component (iv)) | 3.6 parts |
| Genorad 16 (a stabilizer manufactured by Rahn) | 0.05 parts |
| Rapi-Cure DVE-3<br>(vinyl ether (the component (iii)) manufactured by<br>ISP Europe) | 8.0 parts |
| Specific sensitizing dye (the component (i))<br>(Compound (II-4) having the structure shown above) | 10.0 parts |
| Darocur TPO<br>(a photopolymerization initiator (the component (ii))<br>manufactured by Ciba Specialty Chemicals Inc.) | 8.5 parts |
| Irgacure 907<br>(a photopolymerization initiator (the component (ii))<br>manufactured by Ciba Specialty Chemicals Inc.) | 4.0 parts |
| Byk 307 (an anti-foaming agent manufactured by BYK<br>Chemie) | 0.05 parts |

<Evaluation of Ink>

The prepared magenta ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 2 below.

Example 19

The components below were mixed using a high-speed water cooling type stirring machine to obtain a yellow UV ink composition for UV inkjet recording.

| Yellow Ink Composition 1 | |
|---|---|
| Light Acrylate L-A (the component (iii)) | 10 parts |
| Actilane 421(an acrylate monomer manufactured by Akcros) (propoxylated neopentyl glycol diacrylate: a bifunctional acrylate (the component (iii))) | 42.4 parts |
| Photomer 2017(a UV diluent manufactured by EChem) | 17.0 parts |
| Solsperse 32000 (a dispersing agent manufactured by Noveon) | 0.4 parts |
| Cromophtal Yellow LA (a pigment manufactured by Ciba Specialty Chemical Inc. (the component (iv)) | 3.6 parts |
| Genorad 16(a stabilizer manufactured by Rahn) | 0.05 parts |
| Rapi-Cure DVE-3 (vinyl ether (the component (iii)) manufactured by ISP Europe) | 8.0 parts |
| Specific sensitizing dye (the component (i)) (Compound (II-3) having the structure shown above) | 10.0 parts |
| Darocur TPO (a photopolymerization initiator (the component (ii)) manufactured by Ciba Specialty Chemicals Inc.) | 8.5 parts |
| Irgacure 907 (a photopolymerization initiator (the component (ii)) manufactured by Ciba Specialty Chemicals Inc.) | 4.0 parts |
| Byk 307(an anti-foaming agent manufactured by BYK Chemie) | 0.05 parts |

<Evaluation of Ink>

The prepared yellow ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 2 below.

Example 20

The components below were mixed using a high-speed water cooling type stirring machine to obtain UV ink composition for UV inkjet recording.

| Black Ink Composition 1 | |
|---|---|
| Light Acrylate L-A (the component (iii)) | 22.4 parts |
| Actilane 421 (an acrylate monomer manufactured by Akcros) | 29.0 parts |
| Photomer 2017 (a UV diluent manufactured by EChem) | 18.0 parts |
| Solsperse 32000 (a dispersing agent manufactured by Noveon) | 0.4 parts |
| Microlith Black C-K (a pigment manufactured by Ciba Specialty Chemical Inc. (the component (iv)) | 2.6 parts |
| Genorad 16 (a stabilizer manufactured by Rahn) | 0.05 parts |
| Rapi-Cure DVE-3 (vinyl ether (the component (iii)) manufactured by ISP Europe) | 5.0 parts |
| Specific sensitizing dye (the component (i)) (Compound (II-4) having the structure shown above) | 10.0 parts |
| Darocur TPO (a photopolymerization initiator (the component (ii)) manufactured by Ciba Specialty Chemicals Inc.) | 8.5 parts |
| Irgacure 907 (a photopolymerization initiator (the component (ii)) manufactured by Ciba Specialty Chemicals Inc.) | 4.0 parts |
| Byk 307 (an anti-foaming agent manufactured by BYK Chemie) | 0.05 parts |

<Evaluation of Ink>

The prepared black ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 2 below.

Comparative Example 1

The components below were mixed using a high-speed water cooling stirring machine to obtain UV ink composition for UV inkjet recording.

| White Ink Composition C1 | |
|---|---|
| Light Acrylate L-A (lauryl acrylate: a monofunctional acrylate (the component (iii))) | 18.4 parts |
| Actilane 421 (an acrylate monomer manufactured by Akcros) (propoxylated neopentyl glycol diacrylate: a bifunctional acrylate (the component (iii))) | 26.0 parts |
| Photomer 2017 (a UV diluent manufactured by EChem) | 18.0 parts |
| Solsperse 36000 (a dispersing agent manufactured by Noveon) | 2.0 parts |
| MICROLITH WHITE R-A (a pigment manufactured by Ciba Specialty Chemical Inc. (the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP Europe) | 8.0 parts |
| Darocur TPO (a photopolymerization initiator (the component (ii)) manufactured by Ciba Specialty Chemicals Inc.) | 8.5 parts |
| Irgacure 907 (a photopolymerization initiator (the component (ii)) manufactured by Ciba Specialty Chemicals Inc.) | 4.0 parts |
| Byk 307 (an anti-foaming agent manufactured by BYK Chemie) | 0.05 parts |

<Evaluation of the Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 2 below.

Comparative Example 2

The components below were mixed using a high-speed water cooling stirring machine to obtain UV ink composition for UV inkjet recording.

| White Ink Composition C1 | |
|---|---|
| Light Acrylate L-A (lauryl acrylate: a monofunctional acrylate (the component (iii))) | 18.4 parts |
| Actilane 421 (an acrylate monomer manufactured by Akcros) (propoxylated neopentyl glycol diacrylate: a bifunctional acrylate (the component (iii))) | 26.0 parts |
| Photomer 2017 (a UV diluent manufactured by EChem) | 18.0 parts |
| Solsperse 36000 (a dispersing agent manufactured by Noveon) | 2.0 parts |
| MICROLITH WHITE R-A (a pigment manufactured by Ciba Specialty Chemical Inc. (the component (iv)) | 15.0 parts |
| Genorad 16 (a stabilizer manufactured by Rahn) | 0.05 parts |
| Rapi-Cure DVE-3 (vinyl ether (the component (iii)) manufactured by ISP | 8.0 parts |

White Ink Composition C1 (continued)

| | |
|---|---|
| Europe) | |
| 2-chlorothioxantone | 8.0 parts |
| (comparative sensitizing dye below, in Tables 1 and 2 below, expressed as CLTX) | |
| Darocur TPO | 8.5 parts |
| (a photopolymerization initiator (the component (ii)) manufactured by Ciba Specialty Chemicals Inc.) | |
| Irgacure 907 | 4.0 parts |
| (a photopolymerization initiator (the component (ii)) manufactured by Ciba Specialty Chemicals Inc.) | |
| Byk 307 | 0.05 parts |
| (an anti-foaming agent manufactured by BYK Chemie) | |

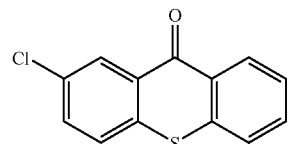

2-chlorothioxantone

<Evaluation of the Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 2 below.

Comparative Example 3

The components below were mixed using a high-speed water cooling stirring machine to obtain UV ink composition for UV inkjet recording.

White Ink Composition C2

| | |
|---|---|
| Light Acrylate L-A | 16.4 parts |
| (lauryl acrylate: a monofunctional acrylate (the component (iii)) | |
| Actilane 421 (an acrylate monomer manufactured by Akcros) | 23.0 parts |
| (propoxylated neopentyl glycol diacrylate: a bifunctional acrylate (the component (iii))) | |
| Photomer 2017 (a UV diluent manufactured by EChem) | 15.0 parts |
| Solsperse 36000 (a dispersing agent manufactured by Noveon) | 2.0 parts |
| MICROLITH WHITE R-A | 15.0 parts |
| (a pigment manufactured by Ciba Specialty Chemical Inc. (the component (iv)) | |
| Genorad 16 (a stabilizer manufactured by Rahn) | 0.05 parts |
| Rapi-Cure DVE-3 | 8.0 parts |
| (vinyl ether (the component (iii)) manufactured by ISP Europe) | |
| 2,4-diethylthioxantone | 8.0 parts |
| (comparative sensitizing dye below, in Tables 1 and 2 below, expressed as DETX) | |
| Darocur TPO | 8.5 parts |
| (a photopolymerization initiator (the component (ii)) manufactured by Ciba Specialty Chemicals Inc.) | |

White Ink Composition C2 (continued)

| | |
|---|---|
| Irgacure 907 | 4.0 parts |
| (a photopolymerization initiator (the component (ii)) manufactured by Ciba Specialty Chemicals Inc.) | |
| Byk 307 | 0.05 parts |
| (an anti-foaming agent manufactured by BYK Chemie) | |

2,4-diethylthioxantone

<Evaluation of the Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 2 below.

Comparative Example 4

The components below were mixed using a high-speed water cooling stirring machine to obtain UV ink composition for UV inkjet recording.

White Ink Composition C2

| | |
|---|---|
| Light Acrylate L-A | 16.4 parts |
| (lauryl acrylate: a monofunctional acrylate (the component (iii)) | |
| Actilane 421 (an acrylate monomer manufactured by Akcros) | 23.0 parts |
| (propoxylated neopentyl glycol diacrylate: a bifunctional acrylate (the component (iii))) | |
| Photomer 2017 (a UV diluent manufactured by EChem) | 15.0 parts |
| Solsperse 36000 (a dispersing agent manufactured by Noveon) | 2.0 parts |
| MICROLITH WHITE R-A | 15.0 parts |
| (a pigment manufactured by Ciba Specialty Chemical Inc. (the component (iv)) | |
| Genorad 16 (a stabilizer manufactured by Rahn) | 0.05 parts |
| Rapi-Cure DVE-3 | 8.0 parts |
| (vinyl ether (the component (iii)) manufactured by ISP Europe) | |
| 6-chlorothiochromanone | 8.0 parts |
| (comparative sensitizing dye below) | 8.0 parts |
| Darocur TPO | 8.5 parts |
| (a photopolymerization initiator (the component (ii)) manufactured by Ciba Specialty Chemicals Inc.) | |

White Ink Composition C2

| | |
|---|---|
| Irgacure 907 | 4.0 parts |
| (a photopolymerization initiator (the component (ii)) manufactured by Ciba Specialty Chemicals Inc.) | |
| Byk 307 | 0.05 parts |
| (an anti-foaming agent manufactured by BYK Chemie) | |

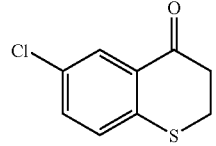

6-chlorothiochromanone

<Evaluation of Ink>

The prepared white ink composition was printed on a polyvinyl chloride sheet and passed at the specific rate under light from an ultraviolet light-emitting diode (UV-LED) so that it was exposed at a specifically controlled amount of the light. The print produced with the ink was evaluated in a similar manner to that in Example 1. Results are shown in Table 2 below.

TABLE 1

| | (i) Specific Sensitizing Dye or Comparative Sensitizing Dye | (ii) Photo-polymerization Initiator | Curing Sensitivity | Anti-Blocking Property | Ejection Stability |
|---|---|---|---|---|---|
| Example 1 | I-1 | TPO, Irgacure 907 | A | A | C |
| Example 2 | II-38 | TPO, Irgacure 907 | A | A | A |
| Example 3 | II-4 | TPO, Irgacure 907 | A | A | A |
| Example 4 | II-9 | TPO, Irgacure 907 | A | A | A |
| Example 5 | II-48 | TPO, Irgacure 907 | B | A | A |
| Example 6 | II-58 | TPO, Irgacure 907 | A | A | B |
| Example 7 | II-53 | TPO, Irgacure907 | B | B | A |
| Example 8 | II-67 | TPO, Irgacure 907 | B | B | A |
| Example 9 | I-18 | TPO, Irgacure 907 | B | A | B |
| Example 10 | II-75 | TPO, Irgacure 907 | B | A | A |
| Example 11 | II-4, II-83 | TPO, Irgacure 907 | A | A | A |
| Example 12 | II-4 | TPO, Irgacure 907 | A | A | A |

TABLE 2

| | (i) Specific Sensitizing Dye or Comparative Sensitizing Dye | (ii) Photo-polymerization Initiator | Curing Sensitivity | Anti-Blocking Property | Ejection Stability |
|---|---|---|---|---|---|
| Example 13 | II-4 | TPO, Irgacure 184, benzophenone | B | A | A |
| Example 14 | II-4 | Irgacure 2959, Irgacure 819 | B | A | A |
| Example 15 | II-5 | Irgacure 2959, Irgacure 250 | C | A | A |
| Example 16 | II-4 | Irgacure 819, Irgacure 907 | A | A | A |
| Example 17 | II-4 | TPO, Irgacure 907 | A | A | A |
| Example 18 | II-4 | TPO, Irgacure 907 | A | A | A |
| Example 19 | II-4 | TPO, Irgacure 907 | A | A | A |
| Example 20 | II-4 | TPO, Irgacure 907 | A | A | A |

TABLE 2-continued

|  | (i) Specific Sensitizing Dye or Comparative Sensitizing Dye | (ii) Photo-polymerization Initiator | Curing Sensitivity | Anti-Blocking Property | Ejection Stability |
| --- | --- | --- | --- | --- | --- |
| Comparative example 1 | None | TPO, Irgacure 907 | C | C | A |
| Comparative example 2 | CLTX | TPO, Irgacure 907 | C | C | D |
| Comparative example 3 | DETX | TPO, Irgacure 907 | C | C | C |
| Comparative example 4 | 6-chloro-thiochromanone | TPO, Irgacure 907 | C | C | A |

As is evident from Tables 1 and 2, the ink compositions of Examples 1 to 14 and 16 to 20 according to the invention were each cured with high sensitivity. The sensitivity was particularly high when the sensitizing dye containing a sulfur atom (the sensitizing dye used in each of Examples 1 to 20) was used in combination with an α-aminoketone polymerization initiator, Irgacure 907. The white ink composition of Example 1 did not have good color reproducibility, because the sensitizing dye I-1 caused a yellowish coloration. However, the white ink composition of each of Examples 2 to 16 gave a highly-sensitive white ink with good color reproducibility.

The ink composition of each of Comparative Examples 2 and 3, that contains the sensitizing dye which dyes does not have a polymerizable group, needed a high energy of 1000 mJ to become completely free from surface stickiness, although its sensitivity was higher than that of Comparative Example 1 containing no sensitizing dye.

According to the invention, there are provided ink compositions that are curable with high sensitivity even upon exposure to low-power radiation and capable of forming high-quality images and have high anti-blocking property which allow the formation of less sticky image surfaces.

Inkjet recording methods capable of forming high-quality images with a high level of anti-blocking property are provided using the ink composition of the invention.

Novel polymerizable compounds useful as sensitizing dyes are also provided.

The invention includes the following embodiments.

<1> An ink composition, comprising: (i) a sensitizing dye that has a polymerizable substituent and is represented by the following Formula (I) or Formula (II), (ii) a polymerization initiator, and (iii) a polymerizable compound having an ethylenically unsaturated bond:

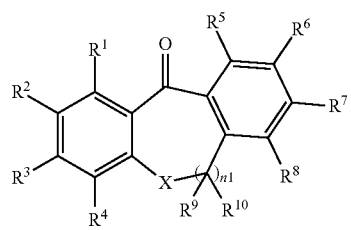
(I)

(II)

wherein in Formula (I), X represents O, S or $NR^a$; n1 represents 0 or 1; and $R^a$, $R^1$, $R^2$, $R^3$, $R^4$, $R^5$, $R^6$, $R^7$, $R^8$, $R^9$, and $R^{10}$ each independently represent a hydrogen atom or a monovalent substituent, provided that at least one of $R^a$, $R^1$, $R^2$, $R^3$, $R^4$, $R^5$, $R^6$, $R^7$, $R^8$, $R^9$, or $R^{10}$ has a polymerizable unsaturated double bond; wherein in Formula (II), X represents O, S or $NR^b$; n2 represents 0 or 1; and $R^b$, $R^{11}$, $R^{12}$, $R^{13}$, $R^{14}$, $R^{15}$, $R^{16}$, $R^{17}$, and $R^{18}$ each independently represent a hydrogen atom or a monovalent substituent, provided that at least one of $R^b$, $R^{11}$, $R^{12}$, $R^{13}$, $R^{14}$, $R^{15}$, $R^{16}$, $R^{17}$, or $R^{18}$ has a polymerizable unsaturated double bond; and wherein any adjacent two of $R^1$, $R^2$, $R^3$, $R^4$, $R^5$, $R^6$, $R^7$, $R^8$, $R^{11}$, $R^{12}$, $R^{13}$, or $R^{14}$ may be joined to form a ring.

<2> The ink composition of item <1>, wherein (ii) the polymerization initiator is selected from the group consisting of α-aminoketones and acylphosphine oxides.

<3> The ink composition of any one of items <1> to <2>, further comprising (iv) a coloring agent.

<4> The ink composition of any one of items <1> to <3>, wherein the ink composition is for use in inkjet recording.

<5> An inkjet recording method, comprising the steps of: (a) ejecting the ink composition of any one of items <1> to <3> onto a medium to be recorded; and (b) applying active radiation to the ejected ink composition to cure the ink composition.

<6> A compound represented by the following Formula (V):

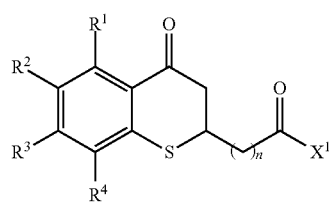
(V)

wherein $R^1$, $R^2$, $R^3$, and $R^4$ each independently represent a hydrogen atom, an alkyl group, an alkoxy group, or a halogen atom; n represents 0 or 1; and $X^1$ represents a monovalent substituent selected from the group consisting of:

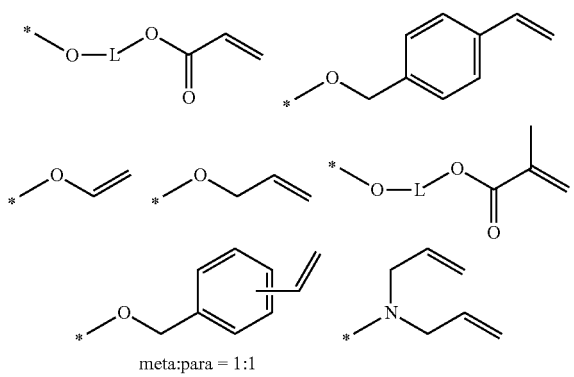

wherein L represents a divalent linking group comprising one or more linking units selected from the group consisting of alkylene groups, alkyleneoxy groups and ester groups, and the mark "*" indicates the position bonded to the heterocycle.

<7> A compound represented by the following Formula (VI):

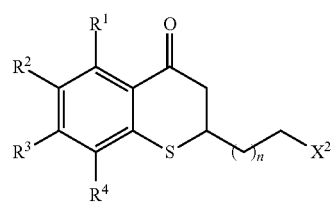

wherein $R^1$, $R^2$, $R^3$, and $R^4$ each independently represent a hydrogen atom, an alkyl group, an alkoxy group, or a halogen atom; n represents 0 or 1, and $X^2$ represents a monovalent substituent selected from the group consisting of:

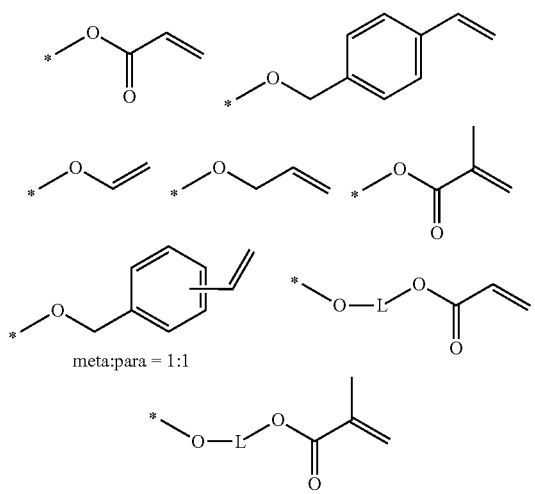

wherein L represents a divalent linking group comprising one or more linking units selected from the group consisting of alkylene groups, alkyleneoxy groups and ester groups, and the mark "*" indicates the position bonded to the heterocycle.

<8> A compound represented by the following Formula (IV):

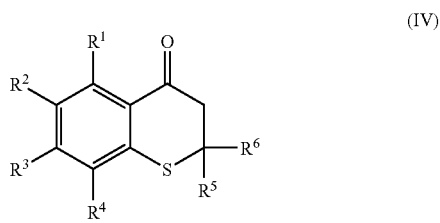

wherein $R^1$, $R^2$, $R^3$, and $R^4$ each independently represent a hydrogen atom, an alkyl group or a halogen atom, $R^5$ and $R^6$ each independently represent a hydrogen atom or a methyl group; and any one of $R^1$, $R^2$, $R^3$, and $R^4$ is $-X^3$, wherein $X^3$ is a monovalent substituent selected from the group consisting of:

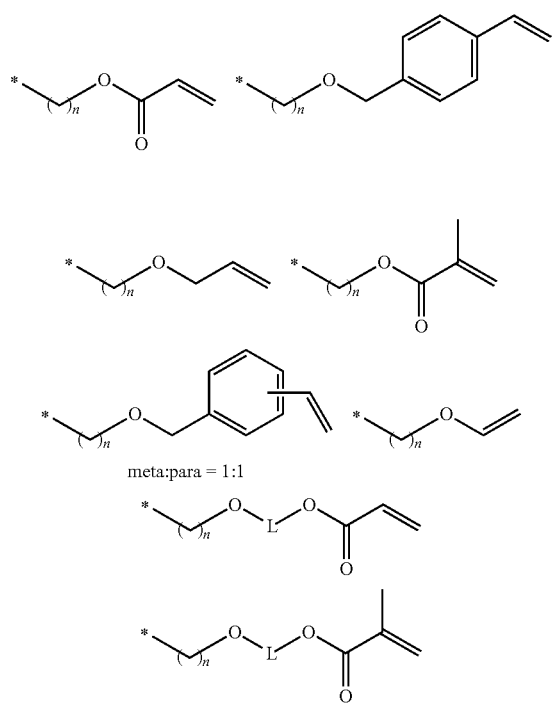

wherein n represents 0 or 1, L represents a divalent linking group comprising one or more linking units selected from the group consisting of alkylene groups, alkyleneoxy groups and ester groups, and the mark "*" indicates the position bonded to the heterocycle.

All publications, patent applications, and technical standards mentioned in this specification are herein incorporated by reference to the same extent as if such individual publication, patent application, or technical standard was specifically and individually indicated to be incorporated by reference.

It will be obvious to those having skill in the art that many changes may be made in the above-described details of the preferred embodiments of the present invention. The scope of the invention, therefore, should be determined by the following claims.

What is claimed is:

1. An ink composition, comprising:
(i) a sensitizing dye that has a polymerizable substituent and is represented by the following Formula (I) or Formula (II):

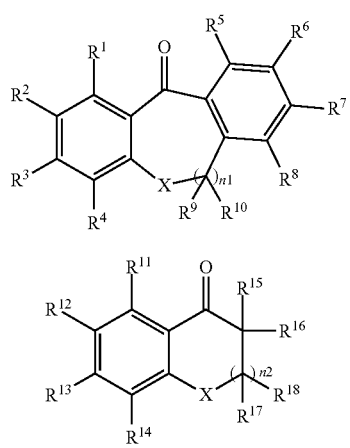

wherein in Formula (I), X represents O, S, or $NR^a$; n1 represents 0 or 1; and $R^a$, $R^1$, $R^2$, $R^3$, $R^4$, $R^5$, $R^6$, $R^7$, $R^8$, $R^9$, or $R^{10}$ each independently represent a hydrogen atom or a monovalent substituent, provided that at least one of $R^a$, $R^1$, $R^2$, $R^3$, $R^4$, $R^5$, $R^6$, $R^7$, $R^8$, $R^9$, or $R^{10}$ has a polymerizable group selected from the group consisting of an acryloyl group, a methacryloyl group, a styryl group, a vinyl group, a vinyl ester group and an allyl group;

wherein in Formula (II), X represents O, S, or $NR^b$; n2 represents 0 or 1; and $R^b$, $R^{11}$, $R^{12}$, $R^{13}$, $R^{14}$, $R^{15}$, $R^{16}$, $R^{17}$, or $R^{18}$ independently represent a hydrogen atom or a monovalent substituent, provided that at least one of $R^b$, $R^{11}$, $R^{12}$, $R^{13}$, $R^{14}$, $R^{15}$, $R^{16}$, $R^{17}$, or $R^{18}$ has a polymerizable unsaturated double bond; and wherein any adjacent two of $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ may be joined to form a ring;

(ii) a polymerization initiator, and
(iii) a polymerizable compound having an ethylenically unsaturated bond.

2. The ink composition of claim 1, wherein (ii) the polymerization initiator is selected from the group consisting of α-aminoketones and acylphosphine oxides.

3. The ink composition of claim 1, further comprising (iv) a coloring agent.

4. The ink composition of claim 1, wherein the ink composition is for use in inkjet recording.

5. The ink composition of claim 2, wherein the ink composition is for use in inkjet recording.

6. The ink composition of claim 3, wherein the ink composition is for use in inkjet recording.

7. An inkjet recording method, comprising the steps of:
(a) ejecting the ink composition of claim 1 onto a medium to be recorded; and
(b) applying active radiation to the ejected ink composition to cure the ink composition.

8. An inkjet recording method, comprising the steps of:
(a) ejecting the ink composition of claim 3 onto a medium to be recorded; and
(b) applying active radiation to the ejected ink composition to cure the ink composition.

9. The ink composition as claimed in claim 1, wherein in Formula (I), at least one of $R^a$, $R^1$, $R^2$, $R^3$, $R^4$, $R^5$, $R^6$, $R^7$, $R^8$, $R^9$ $R^{10}$ has an acryloyl group.

10. The ink composition as claimed in claim 1, wherein in Formula (I), at least one of $R^2$, $R^6$, $R^9$ or $R^{10}$ an acryloyl group.

11. The ink composition as claimed in claim 1, wherein in Formulae (I) and (II), X represents S.

12. The ink composition as claimed in claim 9, wherein in Formulae (I) and (II), X represents S.

13. The ink composition as claimed in claim 10, wherein in Formulae (I) and (II), X represents S.

14. The ink composition as claimed in claim 1, wherein the sensitizing dye is represented by Formula (II).

15. The ink composition as claimed in claim 1, wherein the sensitizing dye is represented by Formula (V):

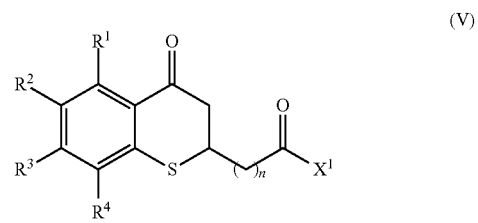

wherein $R^1$, $R^2$, $R^3$, and $R^4$ each independently represents a hydrogen atom, an alkyl group, an alkoxy group, or a halogen atom; n represents 0 or 1; and $X^1$ represents a monovalent substituent selected from the group consisting of:

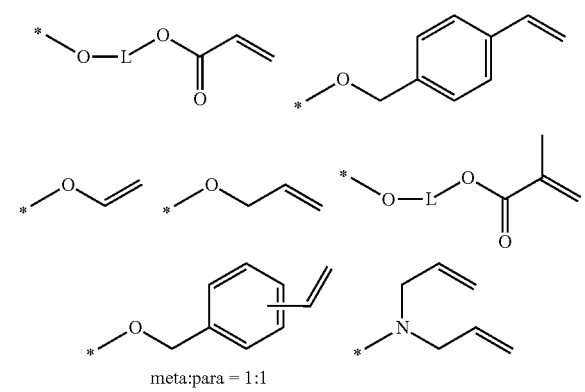

meta:para = 1:1 wherein L represents a divalent linking group comprising one or more linking units selected from the group consisting of alkylene groups, alkyleneoxy groups and ester groups, and the mark "*" indicates the position bonded to the heterocycle.

16. The ink composition as claimed in claim 1, wherein the sensitizing dye is represented by Formula (VI):

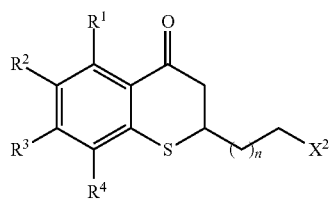

(VI)

wherein $R^1$, $R^2$, $R^3$ and $R^4$ each independently represents a hydrogen atom, an alkyl group, an alkoxy group, or a halogen atom, n represents 0 or 1, and $X^2$ represents a monovalent substituent selected from the group consisting of:

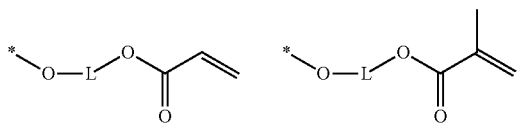

wherein L represents a divalent linking group comprising one or more linking units selected from the group consisting of alkylene groups, alkyleneoxy groups and ester groups, and the mark "*" indicates the position bonded to the heterocycle.

17. The ink composition as claimed in claim 1, wherein the sensitizing dye is represented by Formula (IV):

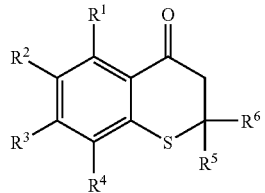

(IV)

wherein $R^1$, $R^2$, $R^3$, and $R^4$ each independently represents a hydrogen atom, an alkyl group or a halogen atom, $R^5$ and $R^6$ each independently represent a hydrogen atom or a methyl group; and any one of $R^1$, $R^2$, $R^3$, and $R^4$ is —$X^3$, wherein $X^3$ is a monovalent substituent selected from the group consisting of:

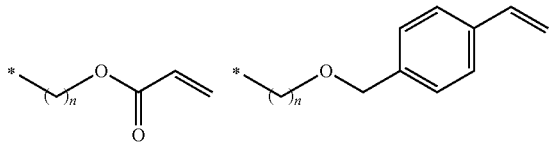

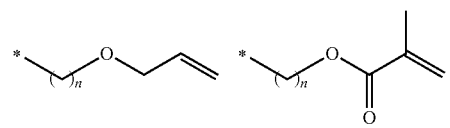

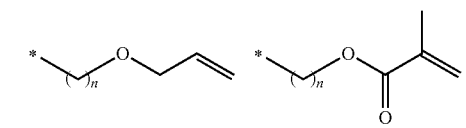

meta:para = 1:1

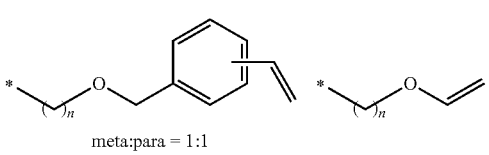

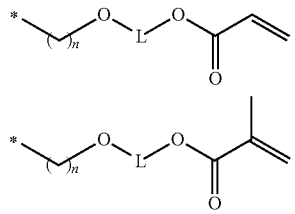

wherein n represents 0 or 1, L represents a divalent linking group comprising one or more linking units selected from the group consisting of alkylene groups, alkyleneoxy groups and ester groups, and the mark "*" indicates the position bonded to the heterocycle.

* * * * *